United States Patent
Kirkpatrick et al.

(10) Patent No.: US 12,019,294 B2
(45) Date of Patent: Jun. 25, 2024

(54) FIBRE OPTIC CABLE, METHODS OF MANUFACTURE AND USE THEREOF

(71) Applicant: EMTELLE UK LIMITED, Hawick (GB)

(72) Inventors: Eben Colin Kirkpatrick, Hawick (GB); William George Rae, Hawick (GB)

(73) Assignee: EMTELLE UK LIMITED, Hawick (GB)

( * ) Notice: Subject to any disclaimer, the term of this patent is extended or adjusted under 35 U.S.C. 154(b) by 37 days.

(21) Appl. No.: 17/434,542

(22) PCT Filed: Feb. 28, 2020

(86) PCT No.: PCT/GB2020/050493
§ 371 (c)(1),
(2) Date: Aug. 27, 2021

(87) PCT Pub. No.: WO2020/174254
PCT Pub. Date: Sep. 3, 2020

(65) Prior Publication Data
US 2022/0137312 A1 May 5, 2022

(30) Foreign Application Priority Data

Feb. 28, 2019 (GB) .................................... 1902716

(51) Int. Cl.
*G02B 6/44* (2006.01)
*C03C 25/105* (2018.01)

(52) U.S. Cl.
CPC ............ *G02B 6/443* (2013.01); *C03C 25/105* (2013.01); *G02B 6/4431* (2023.05); *G02B 6/4486* (2013.01)

(58) Field of Classification Search
CPC .................................................... G02B 6/4495
See application file for complete search history.

(56) References Cited

U.S. PATENT DOCUMENTS

| 4,129,468 A | * | 12/1978 | Knab | ..................... B29C 48/32 57/64 |
| 6,594,427 B1 | * | 7/2003 | Dixon | ..................... G02B 6/443 385/109 |

(Continued)

FOREIGN PATENT DOCUMENTS

| CN | 105403970 A | * | 3/2016 |
| CN | 208283614 U | * | 12/2018 |

(Continued)

OTHER PUBLICATIONS

CN 208283614 U English translation (Year: 2018).*

(Continued)

*Primary Examiner* — Charlie Y Peng
(74) *Attorney, Agent, or Firm* — Perkins IP Law Group LLC; Jefferson Perkins

(57) ABSTRACT

A fibre optic cable (500, 700) comprises retractable fibre units (502) extending in parallel with one another within an extruded polymer tube (504). The fibre units are free to slide in the tube such that a selected fibre unit (702*a*) can be accessed and re-directed by forming an opening in a wall of the tube (504) and withdrawing the selected fibre unit through the opening (710). Each fibre unit comprises two or more optical fibres (506) embedded in a solid resin material (520) to form a coated fibre bundle and an extruded polymer sheath (524). The fibre optic cable is manufactured by feeding the fibre units through an extrusion head (602) by which the extruded tube (504) is formed. The sheath (524) of each fibre unit is primarily polyethylene. A lining (510) of the extruded polymer tube is formed by polymer other than polyethylene, for example polypropylene.

27 Claims, 8 Drawing Sheets

(56) References Cited

U.S. PATENT DOCUMENTS

| | | | |
|---|---|---|---|
| 6,619,697 B2* | 9/2003 | Griffioen | G02B 6/4476 285/133.4 |
| 9,223,102 B1* | 12/2015 | Parris | G02B 6/4429 |
| 2001/0007604 A1* | 7/2001 | Lail | G02B 6/4411 385/112 |
| 2002/0126970 A1* | 9/2002 | Anderson | G02B 6/4433 385/113 |
| 2003/0035635 A1 | 2/2003 | Chastain et al. | |
| 2004/0096167 A1 | 5/2004 | Rossi et al. | |
| 2004/0120665 A1* | 6/2004 | Hurley | G02B 6/441 385/106 |
| 2005/0089285 A1 | 4/2005 | Bocanegra et al. | |
| 2008/0066947 A1* | 3/2008 | Glew | G02B 6/4489 174/131 A |
| 2008/0253722 A1* | 10/2008 | Gronvall | G02B 6/4475 385/103 |
| 2009/0074363 A1 | 3/2009 | Parsons et al. | |
| 2011/0305424 A1* | 12/2011 | Pierce | G02B 6/4465 385/135 |
| 2013/0058613 A1* | 3/2013 | Jost | G02B 6/44 385/102 |
| 2013/0163932 A1* | 6/2013 | Cooke | G02B 6/4472 385/100 |

FOREIGN PATENT DOCUMENTS

| | | |
|---|---|---|
| CN | 208283614 U | 12/2018 |
| EP | 2045890 A1 | 4/2009 |
| FR | 2800171 A1 | 4/2001 |
| FR | 2914752 B1 | 10/2008 |
| GB | 2325572 A | 11/1998 |
| JP | 2004077560 A * | 3/2004 |
| WO | 0198810 A1 | 12/2001 |

OTHER PUBLICATIONS

JP 2004077560 A English translation (Year: 2004).*
CN 105403970 A English translation (Year: 2014).*
The International Bureau of WIPO, International Preliminary Report on Patentability and Written Opinion of the International Searching Authority, dated Aug. 25, 2021, 9 pages.
Prysmian Group, Retractanet xs Taking fibre direct to the doorstep, brochure, YR 2012, 8 pages, Milan, Italy.
Willem Griffioen et al., Tool for Retractable Cables For FttH: Retracting, Storing and Jetting, Proceedings of the 59th International Wire & Cable Symposium, 2010, pp. 100-104.
Emtelle Product Specification CP2509, FibreFlow RTRYVA Fibre, datasheet, Emtelle UK Limited, Dec. 7, 2015, 1 page.
Prysmian Group, Indoor Riser Optical Cable (Verticasa), specification data sheet, Jun. 13, 2018, 2 pages, www.prysmiangroup.com.
Stephen Hough, Sterlite Tech, Installation Procedure of Pullback Cable, Application Notes, Oct. 28, 2016, 8 pages, www.sterlitetechnologies.com.

* cited by examiner (a)

FIBRE OPTIC CABLE, METHODS OF MANUFACTURE AND USE THEREOF

FIELD OF THE INVENTION

The present invention relates to an improved fibre optic cable containing a plurality of retractable optical fibre units, and to methods of manufacturing such cables and methods of installation thereof. Such cables allow a selected fibre unit to be retracted from a section of the cable, and rerouted to an individual user without the need to create a splice joint.

BACKGROUND TO THE INVENTION

Optical fibre transmission lines can be installed through the ground, through ducts, and through service spaces within buildings by a variety of methods, including direct burying (trenching), pulling through ducts, pushing through ducts, blowing through ducts, and combinations of these. Fibre to the home (FTTH) is the generic term for broadband network architecture that uses optical fibre technology to carry data to a residential dwelling from a broadband service provider via a telecommunications cabinet located near the residential dwelling. More generally, not only homes, but office premises are increasingly connected by optical fibres to the wider telecommunications network.

A particular type of cable is known, which comprises multiple "fibre units" contained loosely within an extruded tube. Once installed in the ground, or within a building, the extruded tube can be opened at any point along its length to access the individual fibre units, which extend loosely inside. A selected fibre unit can be accessed, retracted, and rerouted to drop directly to a home/business where fibre provision is required. Several commercial cables of this type are available, including one branded RTRYVA™ from the present applicant. They may be referred to as "pullback cable", "retractable fibre cable", or "mid span"/"mid span access" cable, depending on the manufacturer and user preference. The term "pullback cable" will be used in the following description, as a convenient term for this type of product, and with the existing RTRYVA™ product as a specific known example. Pullback cable offers a number of advantages over traditional cabling solutions because several times more fibre drops can be made from an existing duct compared to traditional cables. Fibre units within pullback cable can contain multiple fibres, varying from 2 to 12 fibres per fibre unit. High speed installation and connectivity can be attained with no specialist training, and without breaking or splicing the fibres, where they branch from the pullback cable to the customer premises. GRP strength members are incorporated in the extruded tube to offer additional strength and longevity, without the need for bulky strength members in the individual fibre units.

Drop tubes can have pre-installed draw string to aid fibre installation to the home. Expensive installation equipment, such as fibre blowing is not required.

Despite these benefits of pullback cable, the use is restricted, or made inefficient, by the limited length of fibre unit that can be withdrawn in one section. Where the premises is located more than a few tens of metres from the route of the pullback cable, steps of withdrawing the selected fibre unit, and redirecting it to the customer premises, must be performed in multiple stages, opening the extruded tube within the ground or other environment several times, and repositioning operatives several times to reach customer premises in stages.

Accordingly, inventors have recognised that, in many situations, the potential benefits of pullback cabling are not realised. The inventors have further recognised that the length of fibre unit withdrawn or installed in one step is limited by the materials and loose tube construction of the fibre units in a conventional pullback cable. Unfortunately, the use of other types of fibre unit, such as fibre units with low friction sheaths, that are known for installation by blowing, cannot readily be substituted into known types of pullback cables, due to the manufacturing process.

SUMMARY OF THE INVENTION

A first aspect of the present invention provides a fibre optic cable comprising a plurality of retractable fibre units extending in parallel with one another within an extruded polymer tube, the fibre units being free to slide relative to one another and to the tube such that a selected fibre unit can be accessed and re-directed by forming an opening in a wall of the tube and withdrawing a length of the selected fibre unit through the opening, wherein each of said fibre units comprises two or more optical fibres embedded in a solid resin material to form a coated fibre bundle and an extruded polymer sheath covering the coated fibre bundle, wherein the extruded polymer sheath of each said fibre unit comprises primarily polyethylene, PE polymer, and wherein at least a lining of the extruded polymer tube of the fibre optic cable is formed by polymer other than polyethylene.

The fibre unit used in the fibre optic cable, also known as a pullback cable, of the invention may for example be based on, or even the same as, a blown fibre unit of the type disclosed in published international patent application WO2004015475A1. Such fibre units have been designed, and used for many years, for installation by blowing with air or other compressed fluid. Fibre units of this type are known to blow hundreds and even thousands of metres, in micro ducts having a compatible low-friction HDPE lining. However, they can also be installed by pulling and/or pushing, depending on the distance and the route involved. The inventors have recognised that, by changing the lining material of the extruded tube of a pullback cable, this type of fibre unit having a low-friction PE sheath can be used as a fibre unit in a pullback cable, greatly extends the range of distances that can be covered by a single withdrawal and installation step. If such a fibre unit, were to be used in the existing extruded tube, it is not likely to survive the manufacturing process of the pullback cable, without fusing at some point to the hot extruded tube.

The lining of the extruded polymer tube may comprise primarily polypropylene, PP.

The lining of the extruded polymer tube may comprise primarily nylon.

The extruded sheath of each said fibre unit may comprise a mixture of PE polymer and one or more additives including a friction reducing material.

Said PE polymer excluding additives may comprise high-density polyethylene, HDPE or a blend of HDPE with other types of PE polymer. The HDPE may comprise at least 90% by weight or at least 30% by weight of the extruded sheath.

The density of the sheath material may be greater than 935 kg/m$^3$, optionally greater than 940 kg/m$^3$.

Said PE polymer may be at least partially cross-linked, a degree of cross-linking determined according to ISO 10147: 2011 being in the range from 15% to 80%, for instance from 20% to 70%.

The solid resin material may comprise a UV-cured resin such as an acrylate material.

The solid resin material may have a tensile modulus greater than 100 MPa, optionally greater than 300 MPa.

The extruded polymer tube may comprise a co-extrusion of said lining material within a main tubular body of a different polymer to the lining. The main tubular body may be of polyethylene. The main tubular body may be extruded of medium density polyethylene MDPE.

The extruded polymer tube may be extruded with one or more strength members integrated in a main wall of the tube during extrusion.

The strength member may be a fibre-reinforced resin rod.

The extruded polymer tube may be further provided with external markings by which a user can avoid the strength member(s) when making said opening.

The extruded sheath of each of said fibre units may be provided with colour and/or other markings by which a selected fibre unit is distinguishable from all the other fibre units in the tube.

When said fibre optic cable is laid out in a generally straight route, a length of 100 m of a selected fibre unit may be withdrawn through an opening in the extruded tube at a speed greater than 1.4 m/s, without a pulling force exceeding the weight of a mass W, defined as the mass per kilometre length of the selected fibre unit.

A length of 100 m of a selected fibre unit may be withdrawn through an opening in the extruded tube at a speed of 1.4 m/s, without a pulling force exceeding a specified fraction of the weight of said mass W, for example 3W/4 or W/2 or W/3.

When said fibre optic cable is laid out in a generally straight route, a length of 100 m of a selected fibre unit may reliably be withdrawn through an opening in the extruded tube at a speed of 1.4 m/s, without a pulling force exceeding 5 N multiplied by the number of optical fibres in the selected fibre unit.

When said fibre optic cable is laid out in a generally straight route, said length of 100 m of a selected fibre unit may reliably be withdrawn through an opening in the extruded tube at a speed of 1.4 m/s, without a pulling force exceeding 2.5 N multiplied by the number of optical fibres in the selected fibre unit.

When said fibre optic cable is laid out in a generally straight route, a length of 200 m of a selected fibre unit may be withdrawn through an opening in the extruded tube at a speed of 1.4 m/s, without a pulling force exceeding 5 N multiplied by the number of optical fibres in the selected fibre unit.

A coefficient of friction $\mu$ between the sheath of one of said fibre units and the lining of the extruded tube may be 0.2 or less, when measured by a capstan friction test of the general type described herein and illustrated in FIG. 8 of the drawings.

A coefficient of friction $\mu$ between the sheaths of said fibre units may be 0.2 or less, when measured by a capstan friction test of the general type described herein and illustrated in FIG. 9 of the drawings.

The invention further provides a method of manufacturing a fibre optic cable comprising a plurality of fibre units extending in parallel with one another within an extruded polymer tube, the method comprising:
 (a) receiving said plurality of fibre units, each fibre unit having been manufactured previously and comprising two or more optical fibres embedded in a solid resin material to form a coated fibre bundle and an extruded polymer sheath covering the coated fibre bundle, the extruded polymer sheath comprising primarily polyethylene, PE polymer;
 (b) feeding said plurality of fibre units together as a bundle through a central opening in an extrusion die, while extruding said polymer tube through said die around the bundle, at least a lining of the extruded polymer tube being formed by polymer other than polyethylene;
 (c) drawing said polymer tube and bundle through the extrusion die while controlling process parameters to draw and cool the polymer tube to have finished interior and exterior dimensions such that the fibre units remain loose within the extruded tube,
 thereby producing said fibre optic cable such that a selected fibre unit can be accessed and re-directed by forming an opening in a wall of the tube and withdrawing a length of the selected fibre unit through the opening.

Features of the first aspect may equally apply to this further aspect of the invention. For example, the lining of the extruded polymer tube may comprise primarily polypropylene.

The lining of the extruded polymer tube may comprise primarily nylon.

The extruded sheath of each said fibre unit may comprise a mixture of PE polymer and one or more additives including a friction reducing material.

The PE polymer may be high-density polyethylene HDPE.

The solid resin material may comprise a UV-cured resin such as an acrylate material.

The solid resin material may have a tensile modulus greater than 100 MPa, optionally greater than 300 MPa.

In step (b) the extruded tube may be formed by co-extrusion of said lining material within a main tubular body of a different polymer to the lining.

The main tubular body may be of polyethylene.

The main tubular body may be extruded of medium density polyethylene MDPE.

In step (b) said extruded tube may be extruded with one or more strength members integrated therein.

The strength member may be a fibre-reinforced resin rod.

In step (b) said extruded tube may be further co-extruded with stripes by which a user can identify the circumferential location(s) of the strength member(s) when making said opening.

The extruded sheath of each of said fibre units may be provided with colour and/or other markings by which a selected fibre unit is distinguishable from all the other fibre units in the tube.

A vacuum tank may be provided downstream of said extrusion die to control shrinkage of the extruded tube during initial cooling.

The invention further provides a method of providing fibre optic connections from a distribution point to a plurality of customer access points, the method comprising:
 (a) installing an optical fibre cable according to the first aspect extending from the distribution point and past the plurality of customer access points;
 (b) for a customer access point, providing an opening in the tube wall of the fibre optic cable at a location convenient for the customer access point and withdrawing a length of a selected fibre unit through the opening;
 (c) providing a branching duct from the vicinity of said opening to said customer access point;
 (d) installing the withdrawn length of the selected fibre unit through the branching duct from the opening to the access point; and (e) repeating steps (b) to (d) for successive customer access points, selecting a different fibre unit each time and forming a new opening or re-using an existing opening at a convenient location.

For at least one selected fibre unit, the length of fibre unit withdrawn through the opening may exceed 100 m, or may exceed 200 m.

For at least one selected fibre unit, the length of fibre unit installed through the branching duct may exceed 100 m, or may exceed 200 m.

For at least one customer access point in step (d) the selected fibre unit may be installed through the branching duct by pushing.

For at least one customer access point in step (d) the selected fibre unit may be installed through the branching duct by blowing.

The polymer of the extruded polymer sheath in each fibre unit may be modified to include various functional additives and fillers, and/or modified in other ways to achieve desired bulk and/or surface properties. The low-friction PE sheath of the fibre units may for example include a silicon-based friction-reducing additive, mineral fillers, colourants, antistatic additives and the like. WO2004015475A1 mentions in particular friction-reducing additives, as well as antistatic additives, and mineral fillers to provide dimensional stability under temperature variations. Cross-linking of the polymer of the sheath after extrusion may also be used to modify its properties, for example to improve dimensional stability, to reduce risk of fusing during extrusion of the extruded polymer tube over the fibre units, and/or to improve chemical resistance. US2003035635A1 discloses air-blown fibre units in which cross-linking is applied in the HDPE sheath to stabilise the dimensions of the sheath under temperature variation, either by itself or in combination with a filler of chopped glass fibre. WO2019053146A1 discloses air-blown fibre units having cross-linkable polyethylene (PEX) as a sheath material, along with additives for friction and colour reduction. The sheath material is optionally PEX blended with HDPE, to achieve a lesser degree of cross-linking than by using PEX alone, and to achieve a higher density. EP0241330A2 discloses the use of cross-linking, including blends of cross-linked and non-cross-linkable material, to improve chemical resistance of the sheath of a cable. Any of the techniques from these references can be applied to modify the properties of the extruded sheath on the fibre units. Additives and modification such as cross-linking can also be applied in the extruded tube, either the whole tube, or a lining of the tube or in its body.

These and other features of the invention will be understood from consideration of the examples described below and the dependent claims, illustrated with the appended drawings.

BRIEF DESCRIPTION OF THE DRAWINGS

Embodiments of the present invention are described below, by way of example only, with reference to the accompanying drawings, in which.

DETAILED DESCRIPTION OF EXEMPLARY EMBODIMENTS

Figure 1:
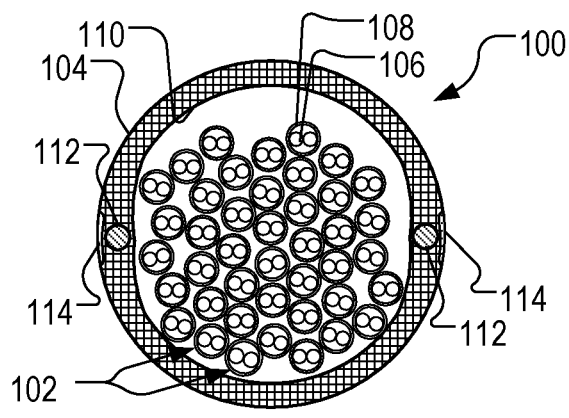
FIG. 1 is a cross-section of a known pullback cable comprising a number of loose tube fibre units surrounded by an extruded, reinforced tube.

FIG. 1 is a schematic cross-section of a known pullback cable 100. Different manufacturers currently provide pullback cables containing optical fibres. An example is that marketed by the present applicant under the trade name RTRYVA™. The cable 100 in this example comprises a plurality of fibre units 102 extending in parallel with one another within an extruded polymer tube 104. The fibre units 102 are free to slide relative to one another and to the tube 104 such that a selected fibre unit 102 can be accessed and re-directed by forming an opening in a wall of the tube 104 and withdrawing a length of the selected fibre unit 102 through the opening.

Figure 2:
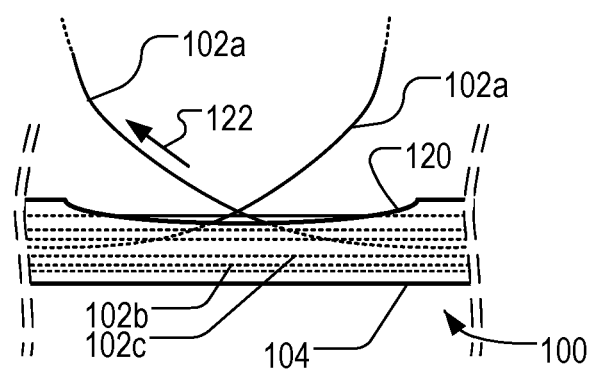
FIG. 2 illustrates the steps of opening a wall of the extruded tube and pulling back a selected fibre unit in a pullback cable of the type shown in FIG. 1.

FIG. 2 illustrates this opening and pullback operation. An opening 120 is formed in the wall of the extruded tube 104 by cutting with a blade, which may be mounted in a special tool in a known manner. One individual fibre unit 102a is selected, for example by colour code, and pulled in a direction 122 from inside the extruded tube 104. Other fibre units 102b and 102c remain within the tube 104. The application of this will be described further below, with reference to FIG. 3.

Returning to the construction of the pullback cable 100, shown in FIGS. 1 and 2, each fibre unit 102 comprises a number of optical fibres 106 contained within an extruded polymer unit tube 108. The unit tube 108, in the known products, is made of polybutylene terephthalate (PBT). PBT is a thermoplastic engineering polymer often used as an insulator in the electrical and electronics industries. It is a type of polyester, which may be provided with additives to improve properties such as, UV resistance and flammability. Other makes of pullback cable known commercially use PVC instead of PBT, in a form which contains plasticisers and fillers, so as to be easily torn.

The fibre units 102 have a conventional "loose tube" design, so that the fibres 106 within each unit tube 108 are also free to slide, the unit tube 108 being filled by a compound such as a water-blocking gel. The optical fibres 106 are generally so-called primary coated optical fibres, in which the glass core and glass cladding layers are coated with layers of resin immediately upon formation, to provide buffering and to protect the surface against damage. The number of optical fibres 106 within each unit tube 108 may vary, for example ranging from 2 to 12. All of the fibre units 102 in the illustrated example comprise two optical fibres 106, but some or all of the fibre units 102 in another example product may contain four fibres, or a different number. The number of fibres 102 within each fibre unit 102 may vary between products, and even within the same product, some tubes 108 may contain different numbers of fibres 106, to provide flexibility of application.

Similarly, the number of fibre units in the pullback cable, and hence the number of optical fibres, may vary, with typical numbers being 12, 24 or 48 fibre units. To produce the fibre units 102, the appropriate number of primary-coated optical fibres 106, each with appropriate colour coding, are passed through an extrusion die, which forms the unit tube 108 around the optical fibres. The different fibre units 102 are made with different colours of extruded unit tube 108, so that they may be identified in the finished pullback cable. Then, to produce the pullback cable 100, the appropriate number of fibre units 102 are bundled together and passed through an extrusion die which forms the extruded tube 104. Depending whether the cable 100 is for exterior or interior use, the polymer of the extruded tube 104 may vary. In an example for exterior use, polyethylene, for example high-density polyethylene (HDPE) or medium-density polyethylene (MDPE) may be selected. An inner surface 110 of the tube wall may be coated with a low friction coating. In some known examples, a thin lining of HDPE with friction reducing additives (slip agents) and antistatic additives is used to form a thin lining, by coextrusion with a main body of the wall. For interior use (within premises) the polyethylene tube body may be substituted by a flame resistant, zero halogen polymer, as is well known.

Also included in the wall of the extruded tube are strength members 112, typically glass fibre reinforced plastic (GFRP, FRP or GRP for short) rods, and typically at diametrically opposite positions on the circumference of the tube 104. The tube wall is provided with stripes or other external markings 114, so that the locations of the strength members 112 can be identified. This allows the strength members to be avoided when making the opening 120. In a known example, stripes of different coloured polymer are co-extruded with the main wall body to provide the external markings 114.

Figure 3:
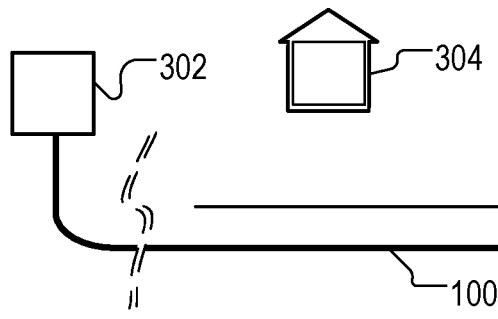
FIG. 3 illustrates use of a pullback cable to provide optical fibre connections to user premises according to a known method.
Figure 3:
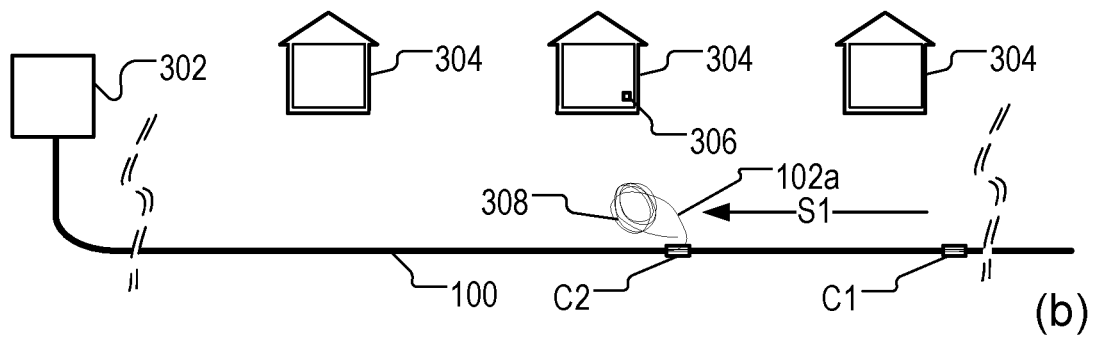
Figure 3:
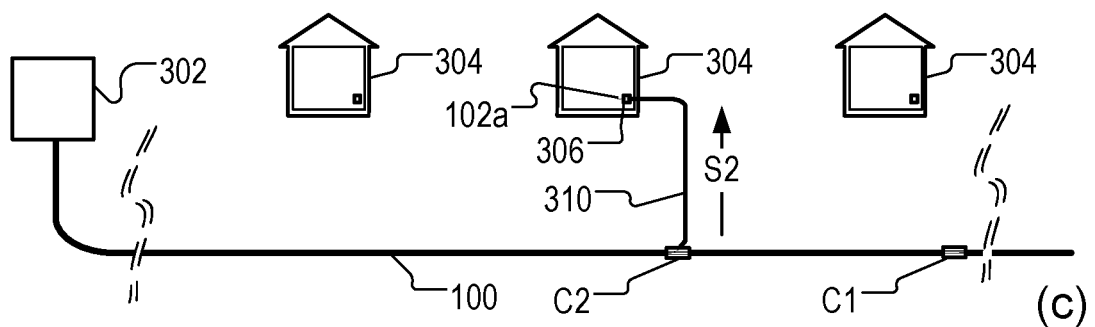

Referring now to FIG. 3, pullback cables 100 have been developed as a quick and easy solution for connecting homes and businesses to a fibre optic. Within the extruded tube of the pullback cable 100, multiple loose fibres are installed during manufacture. Once the pullback cable 100 is installed, duct access & branching of individual fibre units from the pullback cable 100 to individual customer access points is quick and easy and uses the minimal tools, training and installation equipment. Fibres are accessed, excess fibre is pulled back out of the duct, then branched to the customer premises through a dedicated drop duct. Fibre installation to inside the home/business is carried out by pushing or pulling.

Referring to FIG. 3(a), a length of pullback cable 100 is installed, over a route extending from a distribution point 302, such as a splicing cabinet, and passing a number of customer premises 304. In a step S0, the pullback cable 100 is pulled into a duct, or installed into an open trench along the desired route. (In multi-storey premises, the cable may be fixed into a vertical riser shaft). In the splice cabinet or other distribution point 302 the fibres are fixed in place and can be spliced at once if required, or left un-terminated, until one by one they are required.

Referring then to FIG. 3(b), suppose it is desired to make a fibre connection to the middle premises 304, which is provided with a customer access point 306. In a step S1, a cutting tool is used to cut the extruded tube 104 (as illustrated in FIG. 2) to create openings C1 and C2 as shown. Care is taken to avoid the strength members 112, by reference to the stripes or other external markings 114. At the opening C1, which is at a location beyond opening C2 a selected fibre (call it 102a, the same as in FIG. 2) is identified within the open tube 104, and cut, to free its end. Then, at opening C2, the section of selected fibre unit 102a is withdrawn from the tube 104 into a coil as shown at 308. Although the coil 308 is shown loose, it will be understood that in practice it will be safely gathered in a pan or on a reel. The position of the opening C2, and the length of the withdrawn section, are such that the withdrawn section is long enough to reach the customer access point 306.

Referring then to FIG. 3(c) in a step S2, a branching duct 310 is installed from the opening C2 to the customer access point 306, and the withdrawn section of the selected fibre unit 102a is fed through the duct until it emerges at the customer access point 306 as marked. For short distances, pushing may be an adequate installation method. In other cases, pulling may be used, for example using a pulling line that has been pre-installed in the branching duct 310. It will be understood that, as an alternative to installing the branching ducts 310 only at the time of need, branching ducts can be pre-installed for all the customer premises 304. At each opening C1, C2, not shown or described in detail, an enclosure having suitable seals and openings, is provided to protect the opening, and the exposed ends of the branching duct or ducts, against the environment after installation. More than one branching duct can be accommodated in a typical enclosure. The enclosures may be the same as conventional splicing enclosures, while it may be noted that the use of the pullback cable 100 provides for branching without the need to make cuts and splices at the branch location. The fibre unit 102a is continuous from the distribution point 302 to the customer access point 306.

Because the strength members 112 are provided in the extruded tube 104, and there are no separate strength members in the fibre units 102, the overall design can be very compact, compared with what would be required to accommodate the same number of fibre units as individual cables. The diameter of the extruded tube, and hence the overall diameter of the pullback cable itself, may be on the order of 15 to 20 mm. For example, the cable size may be designated 15/9, meaning an outer diameter of 15 mm combined with an inner diameter of 9 mm. Note that the bore of the tube 104 is slightly oval, so that the strength members 112 and stripes 114 can be accommodated in thicker portions of the wall.

Figure 4:
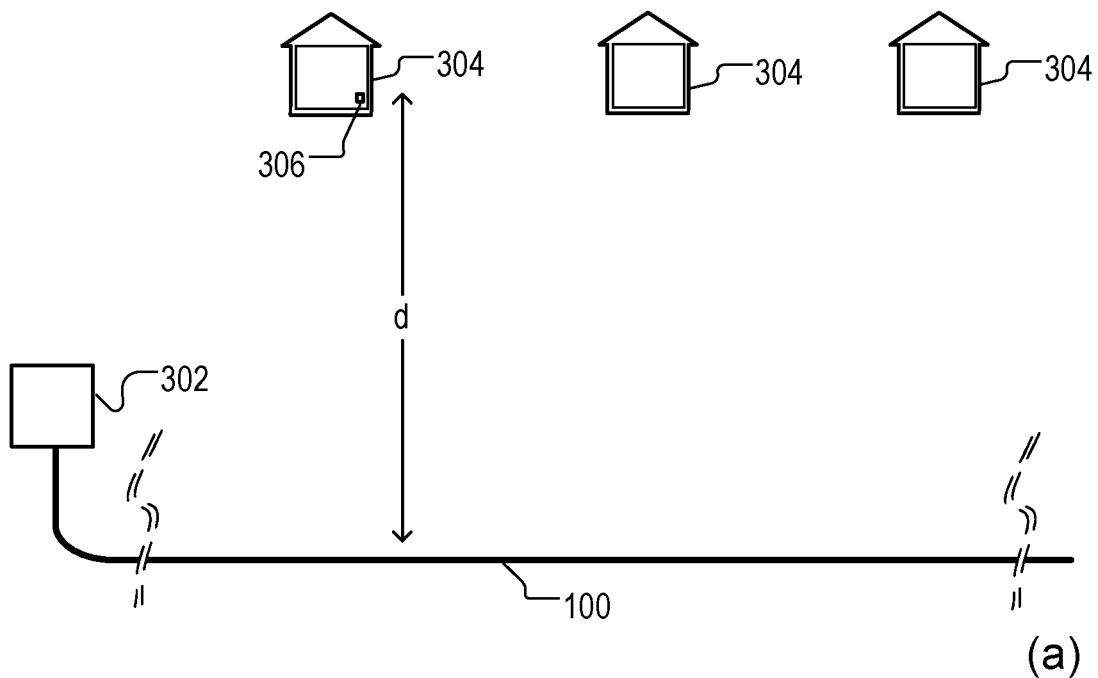
FIG. 4 illustrates problems arising in the known method, when a distance from the pullback cable to the user premises exceeds a pullback distance of the selected fibre unit.
Figure 4:
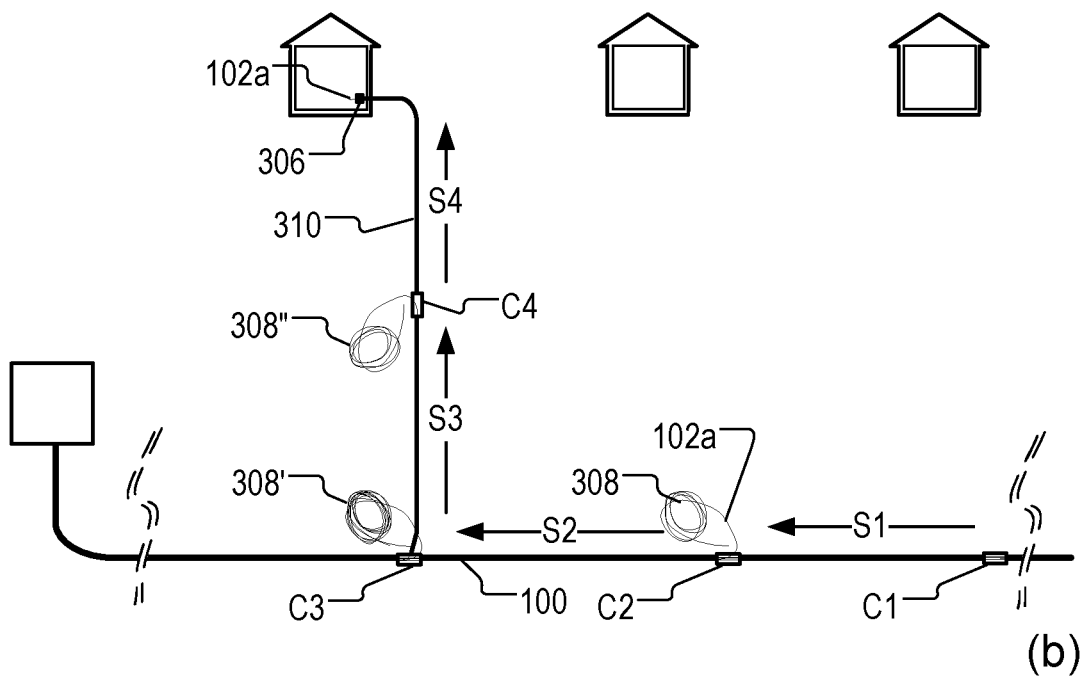

Referring now to FIG. 4, a limitation of the known pullback cables is that the selected fibre units can only be pulled back in sections of limited length, without exceeding tensile performance limits of the products. So, in the example of a fibre unit 102 having two optical fibres in a known pullback cable, a pulling force in excess of 1.5 kg (15 N) is sufficient to damage the fibre unit 102 by stretching the PBT unit tube 104. This causes the PBT polymer to "neck down" on the optical fibres, exposing the branch to unacceptable optical losses. In addition, forces greater than 1.5 kg are liable to snap individual fibres within the unit tube 104. The degree of pulling force required to withdraw a section of unit tube 104 depends strongly on the length of the section, as well as its friction against the other fibre units and the inner wall of the tube 104. In practice these forces limit the length of unit tube 104 that can be withdrawn to about 30 m, or 50 m maximum. Similarly, the properties of the fibre units 102, being of loose tube design do not allow great lengths to be pushed, pulled or blown over a great distance through a branching duct 310. Moreover, even these limited distances may be obtained only in a generally straight route. A lesser distance may be available if the route of the pullback cable 100 is in any way convoluted by bends.

In the situation shown at FIG. 4(*a*), a distanced between the route of the pullback cable 100 and the access point at a premises 304 to be connected to the optical fibre network is greater than the maximum pullback distance, and/or the maximum distance that can be installed through a branching duct 310. This is a common situation with the known products. The conventional solution, as shown in FIG. 4(*b*), is to perform the withdrawal and/or branch installation in multiple stages. Multiple openings C1, C2, C3, are provided in the wall of the pullback cable 100. Similarly, an intermediate opening C4 is provided in the branching duct 310. Using these openings, and more intermediate openings if required, withdrawal of the selected fibre unit is performed in the following steps: a step S1 to withdraw a length of 30 m and gather in a first coil shown at 308; a step S2 to withdraw another length of 30 or so metres followed by the length already withdrawn in step S1, and gather in a larger second coil shown at 308'.

Similarly, re-installation of the selected fibre unit into the branching duct 310 is performed in the following steps: step S3 to install the selected fibre unit from opening C3 along a first section of the branching duct 310 and gather it in a third coil shown at 308" via opening C4; step S4 installing the remaining length from the coil shown at 308" through the last section of the branching duct 310 to the customer access point 306. It will be appreciated that the effort in the operation, and the risk of damaging fibres and fibre units in the process, is doubled. Moreover, when one considers that customer drops of 200 or 300 m are commonplace, and 500 m is not unknown, the number of intermediate openings and withdrawal steps can become very great indeed. The practical and economic benefits of the pullback cable concept become reduced, and eventually lost completely.

Figure 5:
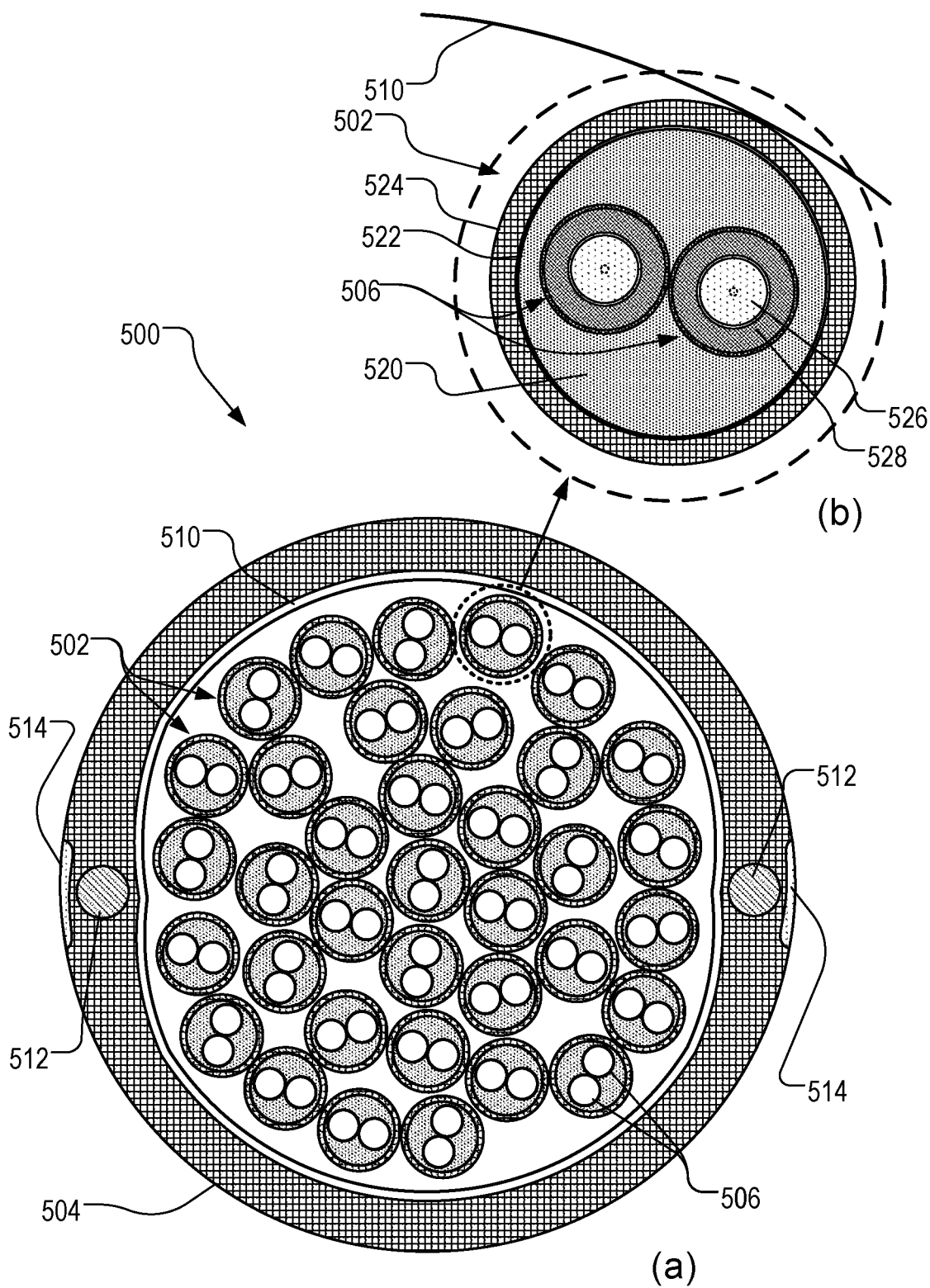
FIG. 5 is a schematic cross-section of a pullback cable according to an embodiment of the present invention, including enlarged detail of a single fibre unit in contact with a lining of the extruded tube.

FIG. 5(*a*) is a cross-section of a modified pullback cable 500 according to an embodiment of the present invention, including (b) enlarged detail of a single fibre unit 502. The cable 500 in this example comprises a plurality of fibre units 502 extending in parallel with one another within an extruded polymer tube 504. Each fibre unit 502 includes a plurality of individual optical fibres 506. As in the known pullback cable 100 the fibre units 502 are free to slide relative to one another and to the tube 504 such that a selected fibre unit 502 can be accessed and re-directed by forming an opening in a wall of the tube 504 and withdrawing a length of the selected fibre unit through the opening. Similar to the known pullback cable 100, the modified pullback cable 500 includes strength members 512 integrated in the wall of the extruded tube 504. These strength members are, for example glass fibre reinforced plastic (GFRP, FRP or GRP for short) rods, and positioned at diametrically opposite positions on the circumference of the tube 504. The form and number of strength members 512 can be varied, to suit the application. Metallic strength members can be incorporated, if desired, although for many applications it will be regarded as a benefit for the construction to be metal-free.

The tube wall is provided with stripes or other external markings 514, so that the locations of the strength members 512 can be identified. This allows the strength members 512 to be avoided when making an opening. In the illustrated example, stripes of different coloured polymer are co-extruded with the main wall body to provide the external markings 514. Other means of providing external markings 514 can be used.

The optical fibres 506 are again so-called primary coated optical fibres, in which a glass body 526 (typically comprising a core and cladding layer, or a graded index core) is coated with two or three layers of resin 528, to provide buffering and to protect the surface against damage. The diameter of the glass core is commonly on the order of 100 µm, for example 125 µm. The diameter of the primary coated optical fibre 506 is typically 250 µm.

The modified pullback cable 500 differs from the known cable 100 in at least two respects. A first difference is that the individual fibre units 502 are no longer in the form of a loose tube of PBT, containing fibres and a gel. As shown in the enlarged detail of FIG. 5(*b*), each fibre unit 502 in the modified cable comprises two or more optical fibres 506 embedded in a solid resin material 520 to form a coated fibre bundle having an outer surface 522. The resin 520 may in particular be a radiation-cured resin, for example UV cured resin, for example an acrylate. Suitable resins are readily available, and similar to the second layer of a typical primary coating 528.

The selected resin has a relatively high glass transition temperature, so that it is not rubbery, but rather solid as it encases the fibres 506 and locks them into a unitary structure. The elastic modulus of the resin material 520 is greater than 100 MPa, for example in the range 300 to 900 MPa. For the purposes of installation and operation, resin material 520 has a hardness (modulus) and tensile strength such that the individual optical fibres 506 are locked in a bundle, and substantially prevented from moving relative to one another, and/or relative to the resin material 520. This coated fibre bundle therefore has a unitary structure and stiffness very different from the loose individual fibres contained within the conventional fibre unit 102 of the known pullback cable 100. On the other hand, the resin material 520 is not so hard and strong that it cannot be crushed and broken away from the fibres 506, when access to the individual fibres 506 is required for termination and/or splicing.

The coated fibre bundle in turn is surrounded by an extruded polymer sheath 524. In particular, the extruded polymer sheath of each fibre unit comprises primarily polyethylene, optionally mixed with friction reducing and/or antistatic additives. In this example, the extruded polymer sheath 524 comprises primarily polyethylene (PE), optionally mixed with friction reducing and/or antistatic additives. The grade of polyethylene used may be, for example high-density polyethylene HDPE, but other grades and/or blends of grades may be used to suit the application. The PE sheath may be more robust against accidental tearing than the easily-torn PVC sheath, mentioned above.

For categorising grades of polyethylene as "high density", "medium density" and so forth, the classification defined in ISO 17855-1-2014 may be applied. So, for example, MDPE is recognised by a density in the range 925-940 kg/m$^3$ and HDPE is recognised by a density of 940 kg/m$^3$ or greater. The density of a blend of different grades of polyethylene will generally be intermediate between the densities of the component grades. Blends including cross-linkable polyethylene (PEX) and HDPE are described further below. Measurement of density can be performed on a sample of the solid sheath material, or on samples of the sheath removed from the fibre unit. A suitable measurement method may be selected according to the type of sample. A specific gravity or "immersion" method is defined in ISO 1183-1:2019. A density gradient column method is defined in ISO 1183-2: 2019.

This type of fibre unit 502 may for example be based on, or even the same as, a cable assembly of the type disclosed in published international patent application WO2004015475A1. Such fibre units have been designed, and used for many years, for installation by blowing with air or other compressed fluid. Fibre units of this type are known to blow hundreds and even thousands of metres, in micro ducts having a compatible low-friction lining. However, they can also be installed by pulling and/or pushing, depending on the distance and the route involved. The outer sheath 524 is extruded onto the optical fibre bundle during manufacture. The outer sheath in the known example is made of HDPE, with or without (usually with) a friction-reducing additive and antistatic additives. The outer sheath 524 protects the bundle and facilitates sliding of the bundle through the tube 504. By suitable control of the extrusion process, and selection of materials, the extruded outer sheath 524 can be prevented from bonding to the coated fibre bundle. This allows it to be ring-cut and removed by sliding over the outer surface 522 of the resin material, when stripping the fibre unit to access the individual fibres. If desired, the inner periphery of the extruded sheath 524 can be made longer than the outer periphery of the surface 522, so that the sheath slides freely at all times relative to the bundle but this is not essential.

The dimensions of the coated fibre bundle and the fibre unit as a whole depend of course on the number of optical fibres contained therein. For a two-fibre unit as shown, the outer diameter of the coated fibre bundle might be in the region of 700 to 900 µm (0.7 to 0.9 mm). The thickness of the extruded sheath 524 might be in the range 100 to 300 µm, for example approximately 200 µm. Thus, the diameter of the fibre unit as a whole may be in the order of 1 mm, for example 1.1 mm. The number of optical fibres within each unit tube may vary, for example ranging from 2 to 12, as illustrated in WO2004015475A1. The outer diameter of a fibre unit containing 12 fibres might be, for example 1.6 mm. All of the fibre units in the illustrated example comprise two optical fibres, but some or all of the fibre units in another example product may contain four fibres, or a different number. The number of fibres within each fibre unit may vary between cables, and even between fibre units within the same cable, to provide flexibility of application. As in the known pullback cable 100, the number of fibre units in the pullback cable, and hence the total number of optical fibres, may vary, with typical numbers being 12, 24 or 48 fibre units.

The inventors have recognised that fibre units adapted for installation by blowing have properties attractive for withdrawal by pulling from a pullback cable. The coefficient of friction of the extruded sheath of the air blown fibre units compares favourably with that of the PBT unit tubes 102 currently used. Similarly, the withdrawn lengths might be expected to install easily in a branching duct, whether by pushing or pulling for short and medium distances, or blowing over longer distances. Unfortunately, the inventors have also recognised that merely substituting such fibre units for the fibre units 102 in the known pullback cable 100 would not be practicable. The reason for this is that the fibre units 102 must survive the process of extrusion of the extruded tube 104, while remaining free to slide in the finished product, and without suffering damage. As illustrated schematically in the detail FIG. 5(b), the extruded sheath 524 of the fibre units can come into contact with the lining 510 of the extruded tube 504. Since the extruded tube 104/504 is formed around the loose bundle of fibre units 102/502 by hot melting and extrusion of the polymer material, the polyethylene lining 110 of the conventional extruded tube 104 would be liable not only to melt and fuse with the polyethylene sheath 524 of one or more fibre units 502 during the extrusion process, if not at all points, then at some point within a production run of hundreds and thousands of metres in length. Such a situation would render the pullback cable useless for its intended purpose.

Accordingly, a second difference between the modified pullback cable 500 and the known pullback cable 100 is in the materials of the extruded tube 504. More specifically, in the modified cable 500 at least a lining of the extruded polymer tube 504 of the pullback cable 500 is formed using a polymer other than polyethylene. In particular embodiments, at least a lining of the extruded polymer tube comprises primarily polypropylene (PP). Polypropylene is similar enough to polyethylene in its processing characteristics, that it can be substituted without undue modification of the manufacturing process, while being quite incompatible with polyethylene and therefore unlikely to fuse with the polyethylene sheath 524 of the fibre units 502.

As illustrated in FIG. 5(a), the extruded tube 504 in the modified pullback cable 500 is formed in at least two layers, including a thin lining 510 of the polymer other than polyethylene, such as polypropylene. The polypropylene of the lining 510 may be mixed with friction reducing additives (slip agents) and antistatic additives. This thin lining 510 is formed by coextrusion with a main body of the wall 504. In other words, the extruded tube comprises a co-extrusion of the lining material within a main tubular body of a different polymer to the lining. The thickness of the lining may be greater than 20 µm, but less than 300 µm, for example less than 200 µm. A range of thickness for example from 50 µm to 150 µm may be envisaged. The thickness should be great enough to be reliably formed, but not so great as to become a structural entity independent of the main body of the tube.

Depending whether the cable is for exterior or interior use, the polymer of the extruded tube 504 may vary. In an example for outdoors use, polyethylene, for example high-density polyethylene (HDPE) or medium-density polyethylene (MDPE) may be selected. For indoor use (within buildings) the polyethylene tube body may be substituted by a flame resistant, zero halogen polymer. Commercially-available grades of polymer for indoors use include Casico FR6083 (from Borealis Group), Eccoh 5995 (from PolyOne Corporation), Megolon® HF8110, and Megolon® S300 (from Mexichem Speciality Compounds).

The manufacturing method and general structure of the product are readily adapted from the method of manufacturing the known pullback cable 100 described and illustrated above. In simple terms, for the manufacture of the pullback cable 500, the appropriate number of fibre units 502 with the extruded polyethylene sheath 524 are bundled together and passed through an extrusion die which forms the extruded tube 504 with the non-polyethylene lining 510.

Figure 6:
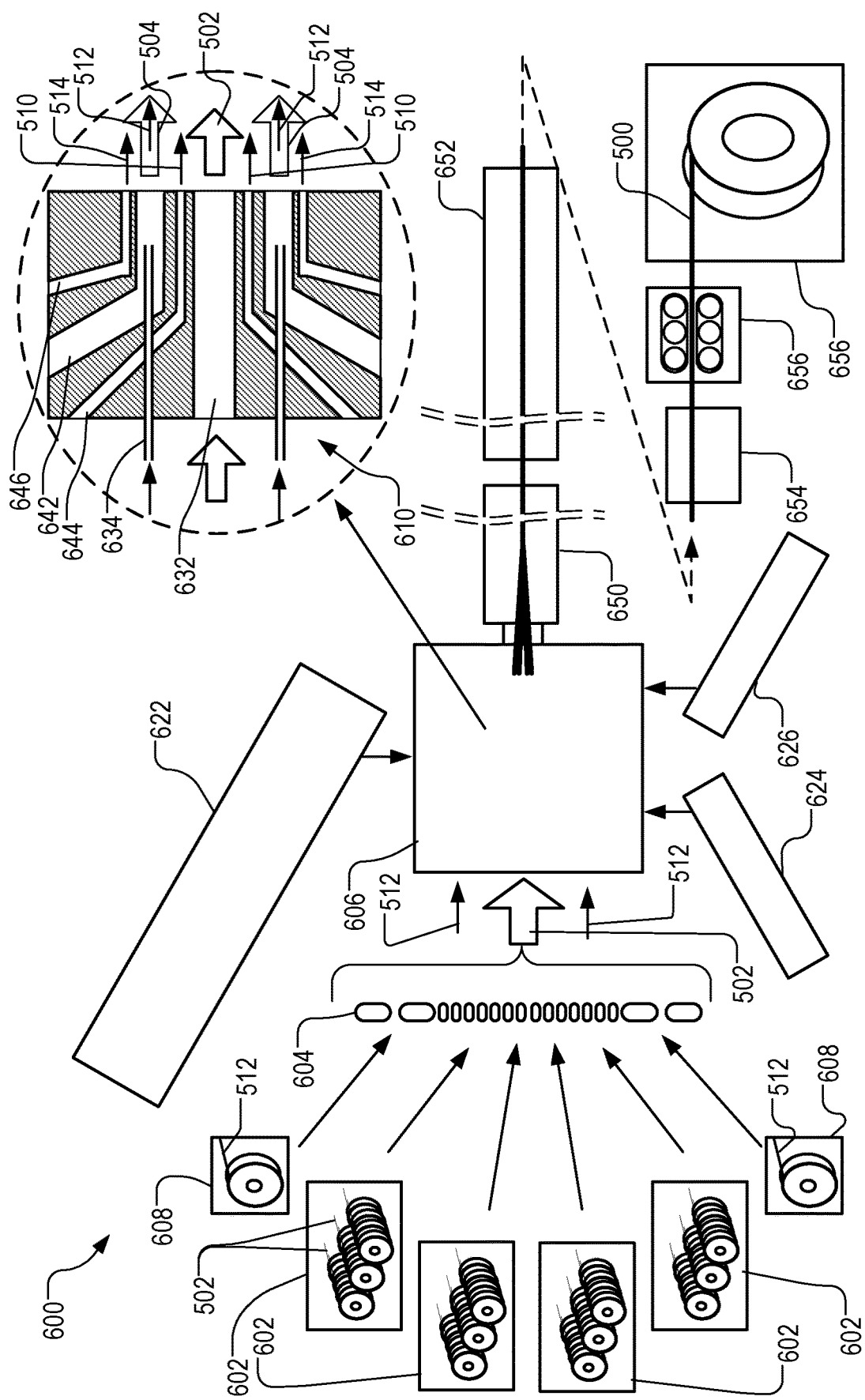
FIG. 6 is a schematic illustration of the manufacturing process of the pullback cable of FIG. 5.

FIG. 6 illustrates schematically the apparatus 600 and processing steps used to manufacture the pullback cable 500 in one embodiment of a method of manufacture according to the present invention.

In advance of manufacturing the pullback cable 500, a desired number of fibre units 502, each containing the appropriate number of primary-coated optical fibres 506, are manufactured by a method such as that described in WO2004015475A1. (Alternatively, such fibre units may be purchased as commercially available blown fibre units.) The different fibre units 502 are made with different colours of extruded sheath 524, and/or other markings so that they may be identified in the finished pullback cable. Each fibre unit will be received, coiled on a reel or drum of suitable diameter, or coiled in pans. Payoff reels allow supply of cable with a designated back-tension.

For an example pullback cable 500 having 48 fibre units, four payoff banks 602 are provided, each delivering 12 individual fibre units 502 into the process. The payoff banks 602 deliver each fibre unit with a suitably controlled back tension, for example of a few hundred grams force. The individual fibre units are gathered into a guide plate 604 which, although illustrated here in a one-dimensional cross-section, is designed to guide the fibre units 502 into a desired two-dimensional array, for presentation to an extrusion head 606. A succession of guide plates may be provided, in practice, although only one is shown. Also shown are payoffs 608 for the strength members 512. As illustrated, these strength members also pass through dedicated openings in the guide plate 604, while they may be provided with dedicated guides in practice. To ensure good mechanical cohesion between the strength members and the surrounding polymer, a coating of heat-activated adhesive may be provided on the strength members when they are supplied.

The extrusion head 606 is shown only as a block in the middle of the drawing FIG. 6, with an enlarged schematic cross-section of an extrusion die 610 in the dashed oval at the upper right portion of the drawing. Extrusion head 606 including extrusion die 610 is supplied with hot melted materials to form the components of the extruded tube 504. A main body extruder 622 delivers the material for the main body of the extruded tube 504. For a product to be used externally, the polymer material may be primarily MDPE, as described above, compacted by heat and pressure by the main body extruder 622 in a known manner. Processing temperatures for this MDPE material may be, for example in the range 165° C. to 175° C., and the extrusion pressure may be in the range 130 to 160 bar, for example between 140 and 155 bar. For an indoor product, or in any case if different wall characteristics are desired, a different material may be used, with appropriate adaptation of the processing temperature and pressure.

A liner extruder 624 processes the polymer other than polyethylene, for example polypropylene or nylon, and delivers it at high pressure to the extrusion head 606 to form the lining 510 of the extruded tube 504. For example, polypropylene may be processed at a temperature in the range 170° C. to 200° C., and delivered with a pressure in the range 160 bar to 200 bar, for example in the range 175 to 195 bar. The pressure of the liner extruder may be higher for the reason that the annular opening for the liner material is narrower, and a higher pressure is required to match the speed of extrusion of the liner to that of the main body. Temperatures are chosen so that each material is not overheating the other, either within the extrusion head or when they come into contact. A stripe extruder 626 delivers polymer of a similar composition to the main body extruder, but with different colouring, into the extrusion head 606, to form the external markings 514 of the extruded tube 504.

As illustrated in the detail of the extrusion die 610, the 48 fibre units 502 are drawn together as a bundle through a central opening 632 in extrusion die 610, while extruding polymer tube 504 through annular channels in the die around the bundle. Dedicated tooling 634 delivers the GRP strength members 512 into the extrusion die 610 to become surrounded by the melted polymer which will form the main body of the extruded tube wall. The melted and pressurised main body polymer from main body extruder 622 enters extrusion die through channels 642. The melted and pressurised lining polymer from liner extruder 624 enters extrusion die through channels 644. The melted and pressurised marking polymer from stripe extruder 626 enters the extrusion die through channels 646 which extend only over the part of the circumference to be marked. In this way, the lining and main body of the tube 504 are extruded around the bundle of fibre units 502, while incorporating the strength members 512 and external markings 514 into the wall of the tube. As mentioned, a coating of adhesive may be provided on the strength members 512 to ensure they become structurally integrated with the tube wall. This adhesive, which is a dry and solid coating when the strength members are supplied, is activated by the heat of the melted main body material.

Downstream of extrusion head 606, a series of cooling tanks 650, 652 are provided, followed by a printing station 654. A tractor unit 656 of caterpillar or similar design applies the tension to draw all the elements of the cable 500 from the payoff banks 602, through the extrusion head and onto a take-up unit 656. In this way, the apparatus draws the extruded tube 504 and the bundle of fibre units through the extrusion die while process parameters of all the illustrated units are controlled to draw and cool the polymer tube to have finished interior and exterior dimensions such that the fibre units remain loose within the extruded tube 504.

Detail of the cooling tanks and control systems can be adapted from known cabling production apparatus, such as used for production of cables generally, and in particular for production of the pullback cable 100 which is already commercially available from various manufacturers. The requirement is to produce the pullback cable 500 in such a form that a selected fibre unit can be accessed and re-directed reliably by forming an opening in a wall of the tube and withdrawing a length of the selected fibre unit through the opening.

In an example apparatus, a first cooling tank 650 is a vacuum tank, for example between five and 10 m long. The application of a (partial) vacuum outside the extruded tube 504 helps the tube to keep its form and avoid collapse onto the bundle of fibre units 502. The second cooling tank 652 may be a longer tank, with water spray cooling, for example over 15 or more metres in length.

Figure 7:
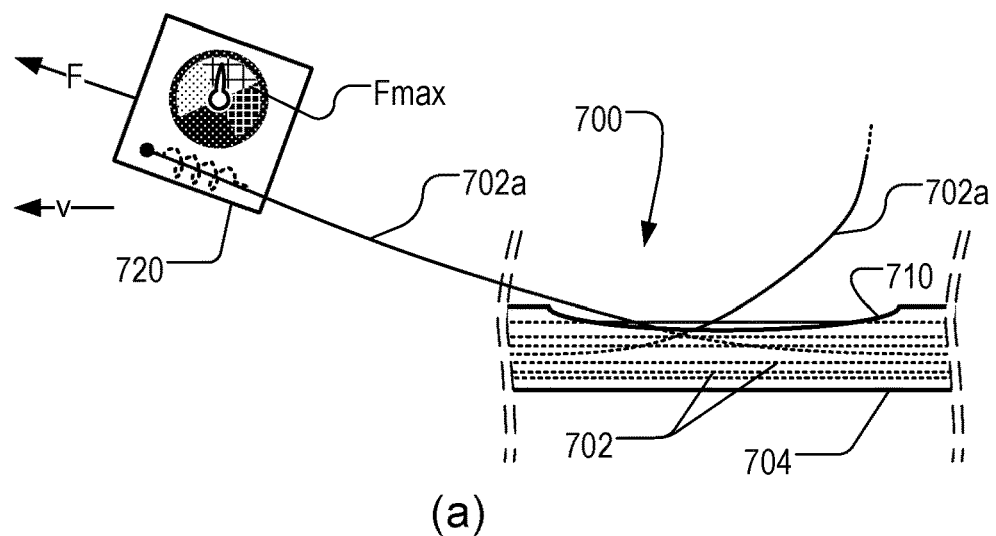
FIG. 7 illustrates (a) a test procedure for measuring pull-out force in the evaluation of pullback cables of the prior art and the invention, (b) test results for a pullback cable according to an embodiment of the present invention, and (c) test results for a known pullback cable of the type illustrated in FIG. 1.
Figure 7:
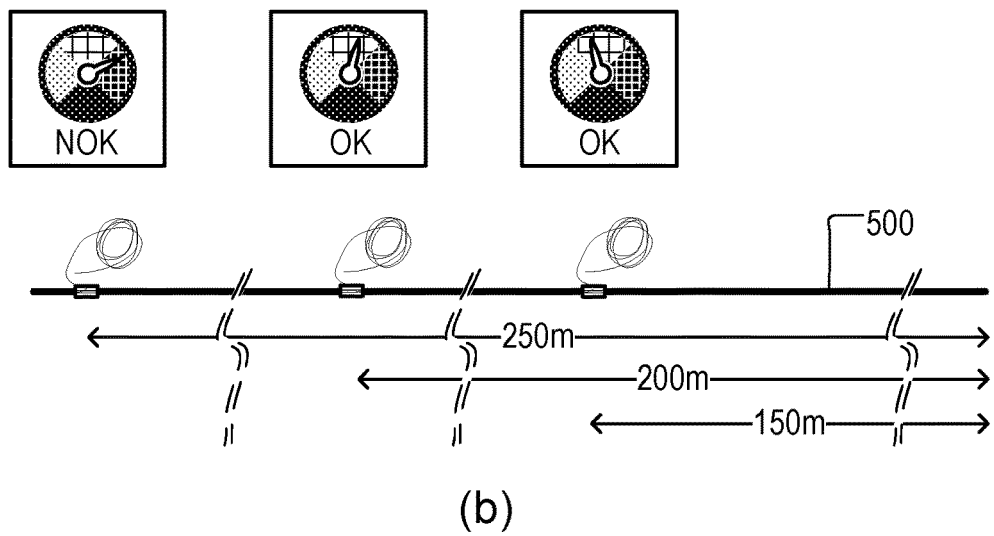
Figure 7:
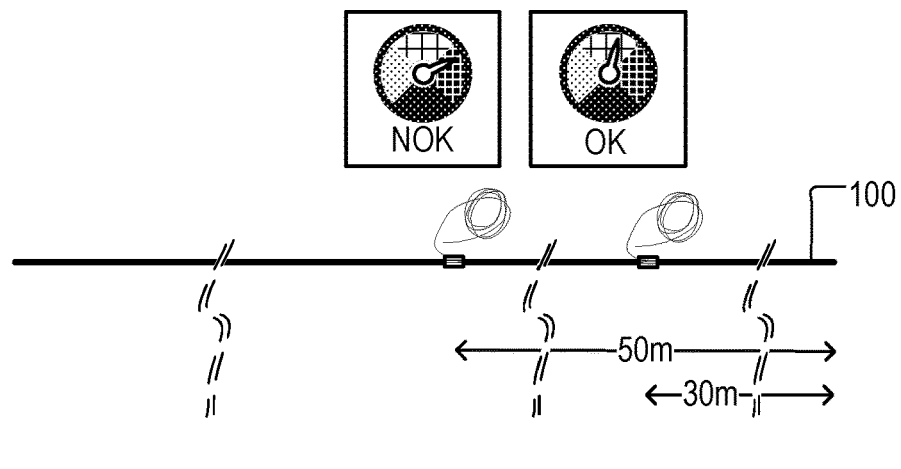

FIG. 7 illustrates the measurement of "tensile performance" of cables such as the pullback cable 500 of the present invention. The term "tensile performance" is generally used to refer to the pulling forces and deformations (stress and strain) applied to the product during installation. Other mechanical parameters such as minimum bend radius, crush resistance and the like are also specified for any commercially applicable product. Other parameters may be defined relating to longer term exposure to forces after installation. Typically, these parameters define forces to be resisted, in terms of maximum tolerable impact on optical performance, measured through the fibres.

As mentioned above, a key limitation with known pullback cables is the difficulty in withdrawing a sufficient length of a selected fibre unit, without exceeding tensile performance limits of the fibre unit. To measure the force required for withdrawal, a set up similar to that illustrated schematically in FIG. 7(a) may be used. A pullback cable 700 of whatever design is laid along a specified route. For a pullback cable, a relatively straight route laid out across a piece of ground may be specified, it may be a few hundred metres long, in any rate, longer than the maximum expected withdrawal length. The pullback cable, as described in the examples above, comprises fibre units 702 loosely arranged within an extruded tube 704. By cutting an opening 710, a selected fibre unit 702 may be accessed for withdrawal. The selected fibre unit may be cut and pulled out with only a single end, or it may be pulled out in a loop, without cutting. The beginning of the section to be withdrawn is pulled through the medium of a tensile force measuring instrument 720. In its simplest form, instrument 720 may be a simple spring scales, of the type used to measure weight of luggage or goods for sale. A weight reading in kilograms can be used as a proxy for tensile force measured in newtons (N). Each kilogram represents approximately 10 N, or more accurately 9.81 N, as is known. Alternatively, or in addition, the instrument may be calibrated directly in newtons. Rather than measure optical performance directly on the selected fibre unit, during and/or after withdrawal, a tensile performance specification for fibre units of this type will be established in advance. This will include a maximum tensile force Fmax, for example, which corresponds to a particular reading on the instrument 720, as labelled. The maximum force for a given product depends on the construction of the product, including the properties of any sheath/unit tube and properties of the individual fibres within.

For practical purposes, withdrawal should be possible at a reasonable pace, without exceeding the tensile performance specification. A walking pace, for example 1 m/s or 1.4 m/s may be specified, as indicated by velocity v in the diagram. It is a matter of choice, whether the test is performed using an automated and calibrated carriage as a pulling device, or whether simply pulling by a human operator walking is accurate enough. For accuracy, tests are repeated multiple times, to ensure that a given performance can be reliably achieved in the field.

FIG. 7(b) illustrates schematically the results of real tests performed on a prototype of the pullback cable 500 described above with reference to FIGS. 5 and 6. A maximum force as a tensile performance parameter is defined for the product, based on its construction and the properties of its components. Bearing in mind that individual fibres within the modified pullback cable 500 are locked together in a matrix by resin material, it is reasonable to assume that the tensile performance parameter of the cable is at least as great as the tensile performance of the individual fibres, multiplied by the number of fibres in the particular fibre unit. Safety margins may be built in, for example to specify that tensile performance for withdrawing the fibre unit should not exceed a certain percentage of the tensile performance of the individual fibres, multiplied by the number of fibres.

Accordingly, if the tensile performance of an individual optical fibre is specified as, for example 10 N force (roughly 1 kg weight), and if a 50% safety margin is applied, the tensile performance Fmax for the fibre unit comprising two, four, six, eight or twelve fibres can be specified simply as 10, 20, 30, 40 or 60 N, respectively.

Another force unit that may be used in measuring tensile performance of cables is the "W" unit, being the weight of a one-kilometre length of the cable product in question. Supposing that a fibre unit has a mass of 1.0 g/m, which may be typical for a 2-fibre or 4-fibre unit of the type used in the present disclosure. That corresponds to 1 kg/km, giving a force W=9.81 N. The parameter W for a 12-fibre unit weighing 2 g/m (i.e. 2 kg/km) represents a force W=19.6 N, and so on. The parameter W can therefore be used to obtain expressions of tensile force such as "1W" or "W/3", which adapt automatically to different products. The tensile performance Fmax can then be expressed as multiples or fractions of the parameter W for a give fibre unit, such as W or 3W/4 and the like.

In tests on the prototype pullback cable 500, in which the lining 510 is made from polypropylene with no friction reducing additives, results similar to those illustrated in FIG. 7(b) have been obtained. A maximum force of around 20 N (2 kg weight) was set as tensile performance parameter Fmax. It will be understood that the friction decreases progressively as the section of fibre unit is withdrawn, being greatest at the start of the withdrawal. Over multiple tests, with a moderate walking pace in the region of 1.4 m/s, it has been found that sections of fibre unit of 150 m and 200 m in length can be reliably withdrawn without exceeding the maximum force (force reading "OK" in the drawing). On the other hand, withdrawing a length of 250 m tends to exceed the maximum force (force reading "NOK"). The term "reliably" in this context may be understood to mean that any and all of the 24, 28, 96 or whatever number of fibre units in the pullback cable can be selected and withdrawn without exceeding the specified force.

These performance figures may be expected to increase, in an embodiment where the polypropylene lining 510 is prepared from a mixture of polypropylene and friction reducing and/or antistatic additives. The friction reducing material may comprise a silicon-based material including a polyether modified poly-(dimethylsiloxane) material such as a polyether modified hydroxy functional poly-(dimethylsiloxane) material. Alternatively, or in addition, erucamide and/or oleamide materials may be used for improving slip and reducing friction. As is known, different additives can take different amounts of time to migrate to the surface and deliver their benefits of lowering friction. By contrast with the results using the modified pullback cable 500, results using a conventional pullback cable 100 are illustrated schematically in FIG. 7(c). Note that the tensile performance parameter Fmax may be very different, typically lower, for the loose tube fibre units of the conventional pullback cable. Strength of the unit tube 104 may be more important than strength of the individual fibres, because the fibres are not locked in a unitary matrix. Moreover, because the fibres are not locked together in a unitary matrix, stresses transferred to the fibres through the unit tube may be imposed unevenly on individual fibres, rather than being shared equally between them. The test illustrated in FIG. 7(c) was performed on fibre units comprising two fibres per fibre unit, encased in PBT unit tubes, with a maximum force specified of 15 N. As mentioned above, above this value, undesirable stretching of the unit tube may occur. In contrast to the modified pullback cable 500, it was found that no more than 50 m of a selected unit tube could reliably be withdrawn, without exceeding this performance. A safe limit of 30 m was defined.

As will be appreciated, unless the distance from a customer access point to the pullback cable route is less than 30 m, using the modified pullback cable 500 will allow the same premises to be connected with far fewer cuts and withdrawal steps, resulting in a much faster and cheaper installation overall, and with less disruption of the ground. Referring to the example of FIG. 4, therefore, the openings C2 and C4 unnecessary, and potentially the opening C1 as well. Instead of separate withdrawal steps S1 and S2, a single step can be used to withdraw the required length fibre unit from opening C3. Instead of separate installation steps S3 and S4, a single installation step is required to get the modified fibre unit 502 from the opening C3 to the premises access point 306. As is known by the skilled person, the distance that a length of optical fibre cable can be installed by pulling or pushing may be significantly less than what can be obtained by blowing, but it may be adequate, for example for short drops within a building, or from street to building.

Using the modified pullback cable 500, the benefits of the pullback cable principle can be extended to a much wider range of applications. Because the strength members 112 are provided in the extruded tube 104, and there are no separate strength members in the fibre units 102, the overall design can be very compact, compared with what would be required to accommodate the same number of fibre units as individual cables. The diameter of the extruded tube, and hence the overall diameter of the pullback cable itself, may be on the order of 15 to 20 mm. For example, the cable size may be designated "15/9", meaning an outer diameter of 15 mm combined with an inner diameter of 9 mm. Note that the bore of the tube 104 is slightly oval, so that the strength members 112 and stripes 14 can be accommodated in thicker portions of the wall. Away from these thicker portions, it can be deduced that the wall thickness, including any lining, is 3 mm. Another example may have a size 16/10, meaning an outer diameter of 16 mm combined with an inner diameter of 10 mm. Again, the wall thickness away from the thickened portions is 3 mm. another example may have a size 20/16, with a wall thickness of 2 mm.

Figure 8:
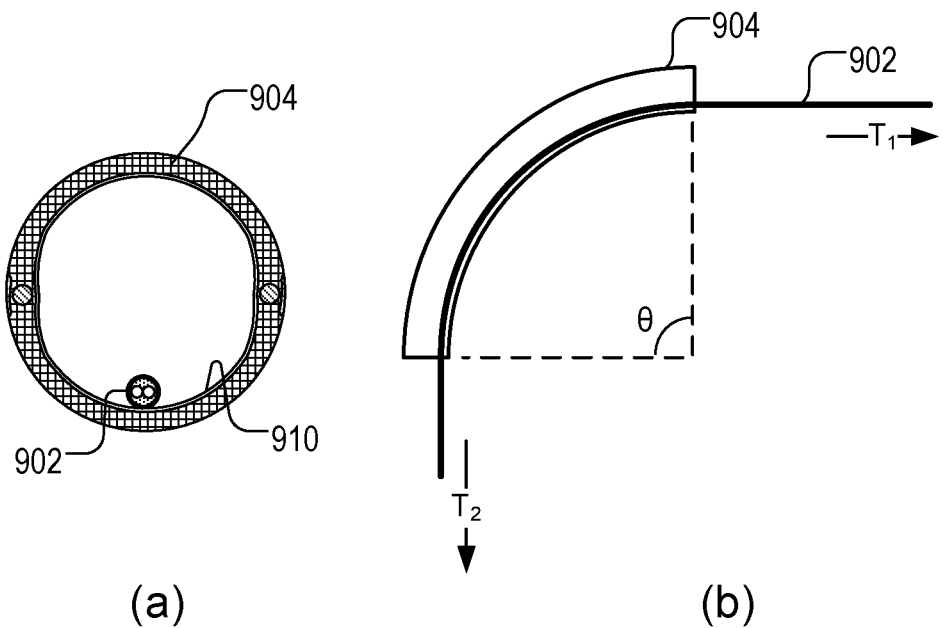
FIG. 8 illustrates a first friction test for evaluation of a pullback cable.
Figure 9:
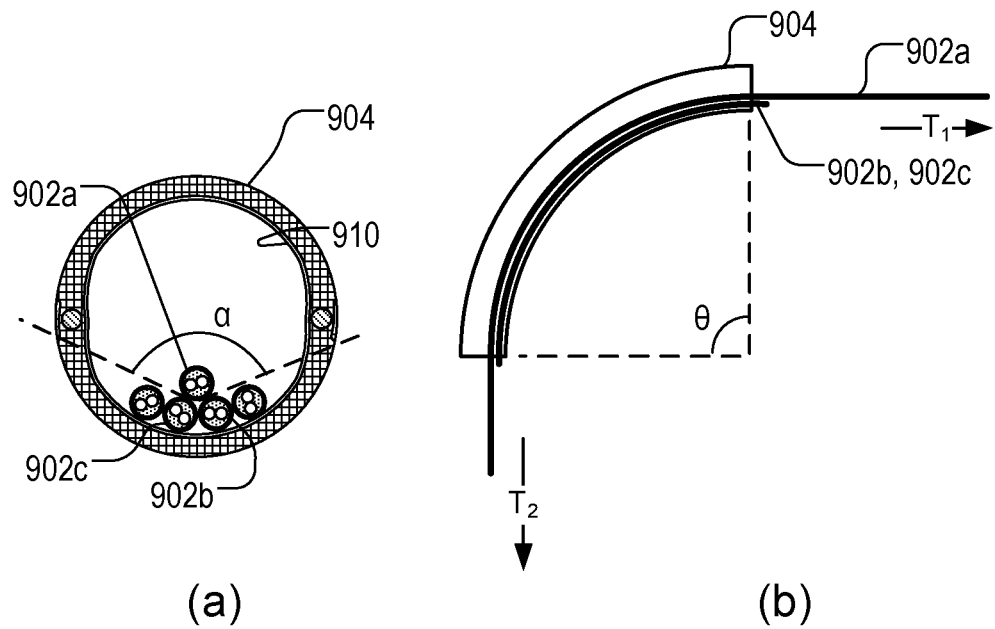
FIG. 9 illustrates a second friction test for evaluation of a pullback cable.

FIGS. 8 and 9 illustrate friction tests, which may be used to characterise the fibre units and/or tube linings in pullback cables. FIG. 8 illustrates a first fiction test, which measures a coefficient of friction p between a representative fibre unit 902 and the lining 910 of the extruded tube 904, illustrated schematically at (a). The test applied is a well-known "capstan" test, in which the elongate moving element (fibre unit 902) is pulled around a certain angle of wrapping θ with a moderate non-zero velocity, while in contact with the stationary element, lining 910. A tension $T_1$ applied in the direction of pulling is measured, while being countered by a known tension $T_2$ applied in the reverse direction at the opposite end of the moving element. This is illustrated schematically at (b) in the drawing. The tension $T_2$ may be a fixed tension applied by a simple suspended weight, while the tension $T_1$ is measured by a suitable instrument. The illustrated angle θ is 90°, in this illustration, but angles, including angles greater than 180° or greater than 360° can also be used.

The ratio of the forces $T_1$ and $T_2$, according to a mathematical model of the capstan test, is determined by the wrap angle and the coefficient of friction μ, in accordance with the formula:

$$\frac{T_1}{T_2} = e^{\mu\theta} \qquad \text{Eq. 1}$$

Therefore, when $T_1$, $T_2$ and θ are known from the experiment, the coefficient of friction μ can be determined for a given combination of fibre unit and tube lining.

FIG. 9 illustrates a similar test, but adapted for measuring friction between fibre units of the same type, rather than between a fibre unit and a tube lining. The setup is shown in cross-section at (a) in the drawing, and in a side schematic detail at (b). For this second friction test, a number of fixed fibre units of the same type are held stationary, between the tube lining and the moving fibre unit. The moving fibre unit is labelled 902a, while the fixed fibre units are labelled 902b, 902c. Consequently, the moving fibre unit slides not over the tube lining 910, but over the sheaths of other, similar, fibre units.

Depending on the setup, it may be considered to use a modified formula. For example, it is known that the above formula for the simple capstan model can be modified into a "V-belt" model, in which the moving element sits between two fixed sides having an angle α between them. This angle α becomes a further parameter taken into account in the modified formula:

$$\frac{T_1}{T_2} = e^{\mu\theta/\sin(\frac{\alpha}{2})} \qquad \text{Eq. 2}$$

The situation illustrated in FIG. 9(a) could be likened to a V-belt with an angle α of approximately 120°, and Equation 2 applied. However, for practical purposes, it has been found more convenient to use the same simple capstan formula Equation 1 to determine the coefficient of friction for both types of test.

Table 1 presents results of tests on a number of samples including the known pullback cable 100 and the new pullback cable 500, as described above. Six tests are performed, each one using four different samples to obtain a statistical average and standard deviation SD. Test A corresponds to the known pullback cable 100, having fibre units contained in PBT unit tubes, within a duct lined with a liner comprising HDPE mixed with antifriction and antistatic additives (designated "HDPE+" in the table). The first type of friction test (FIG. 8) is applied to measure friction between a fibre unit and the tube. Test B is the same, except that the lining 910 of the extruded tube has been modified, and comprises polypropylene PP (in this example, without additives). Test B therefore represents a comparative example, rather than an actual product.

Tests C and D comprise the first type of friction test, but using a modified fibre unit having an HDPE+ sheath, as disclosed above. Test C represents a comparative example, in which the modified fibre unit is pulled through the known extruded tube with the HDPE+ lining. Finally, Test D performs the first type of friction test on the modified pullback cable, in which the fibre unit has an HDPE+ sheath and the extruded tube has a lining of polypropylene PP (without additives).

Comparing the results of Tests A and B in the table, we see that the coefficient of friction between the known PBT fibre unit and a PP tube lining (average μ=0.23) is significantly greater than between the PBT fibre unit and the HDPE+ tube lining in the known pullback cable (average μ=0.15). On the other hand, when the HDPE+ fibre unit is combined with a PP tube lining in a product according to the present disclosure, the coefficient of friction μ=0.13 is similar, if not slightly better than, the coefficient of friction between the fibre unit and the tube lining in the known pullback cable. The coefficient of friction μ measured over a number of samples is less than 0.2, and in fact less than 0.16. As mentioned above, further improvement may be expected, if necessary, by the inclusion of friction reducing additive is in the PP lining material.

TABLE 1

| Sample No. | | 1 | 2 | 3 | 4 | Ave | SD |
|---|---|---|---|---|---|---|---|
| μ (FIG. 8-PBT Fibre Unit v Extruded tube lining) | | | | | | | |
| A | HDPE + Lining | 0.174 | 0.129 | 0.174 | 0.117 | 0.15 | 0.02 |
| B | PP Lining | 0.257 | 0.222 | 0.232 | 0.220 | 0.23 | 0.01 |
| μ (FIG. 8-HDPE + Unit v Extruded tube lining) | | | | | | | |
| C | HDPE + Lining | 0.110 | 0.117 | 0.115 | 0.101 | 0.11 | 0.01 |
| D | PP Lining | 0.124 | 0.110 | 0.143 | 0.132 | 0.13 | 0.01 |
| μ (FIG. 9-Fibre unit v Extruded tube lining) | | | | | | | |
| E | PBT Unit Tube | 0.247 | 0.312 | 0.343 | 0.328 | 0.31 | 0.03 |
| F | HDPE + Fibre Unit | 0.148 | 0.193 | 0.206 | 0.192 | 0.18 | 0.02 |

Moving to the second type of test, illustrated in FIG. 9, Test E measures the friction between fibre units having the conventional PBT unit tube construction. Test F measures the friction between fibre units having the form proposed in the present disclosure, including the HDPE+ sheath. Accordingly, it may be expected that Test E represents the friction for a typical fibre unit being pulled from the middle of a pullback cable of known type, while Test F represents the friction for a typical fibre unit being pulled from the middle of the modified pullback cable according to the present disclosure.

As will be seen from the table, the coefficient of friction between fibre units in the modified pullback cable 500 is much lower than that in the known cable 100 having PBT unit tubes. The coefficient of friction μ=0.18, measured by the method of FIG. 9 and Equation 1, is on average less than 0.22, in fact less than 0.2, where the known fibre units have a coefficient of friction of around 0.3. Frictional forces required to withdraw a given length of a selected fibre unit in the real product may therefore be expected to be substantially lower than in the known product.

In conclusion, and bearing in mind that Tests A and E represent the known product, while Tests D and F represents the product made according to the present disclosure, the present disclosure provides a product which can be manufactured by extrusion of the extruded tube around a plurality of PE-sheath fibre units, and with friction coefficients as low as, and in fact lower than, those in the known pullback cable. Combined with the superior strength of the modified fibre units, in which the fibres are embedded in a solid resin material, the length of fibre unit that can be retrieved without damage is greatly increased, as demonstrated in FIG. 7.

Figure 10:
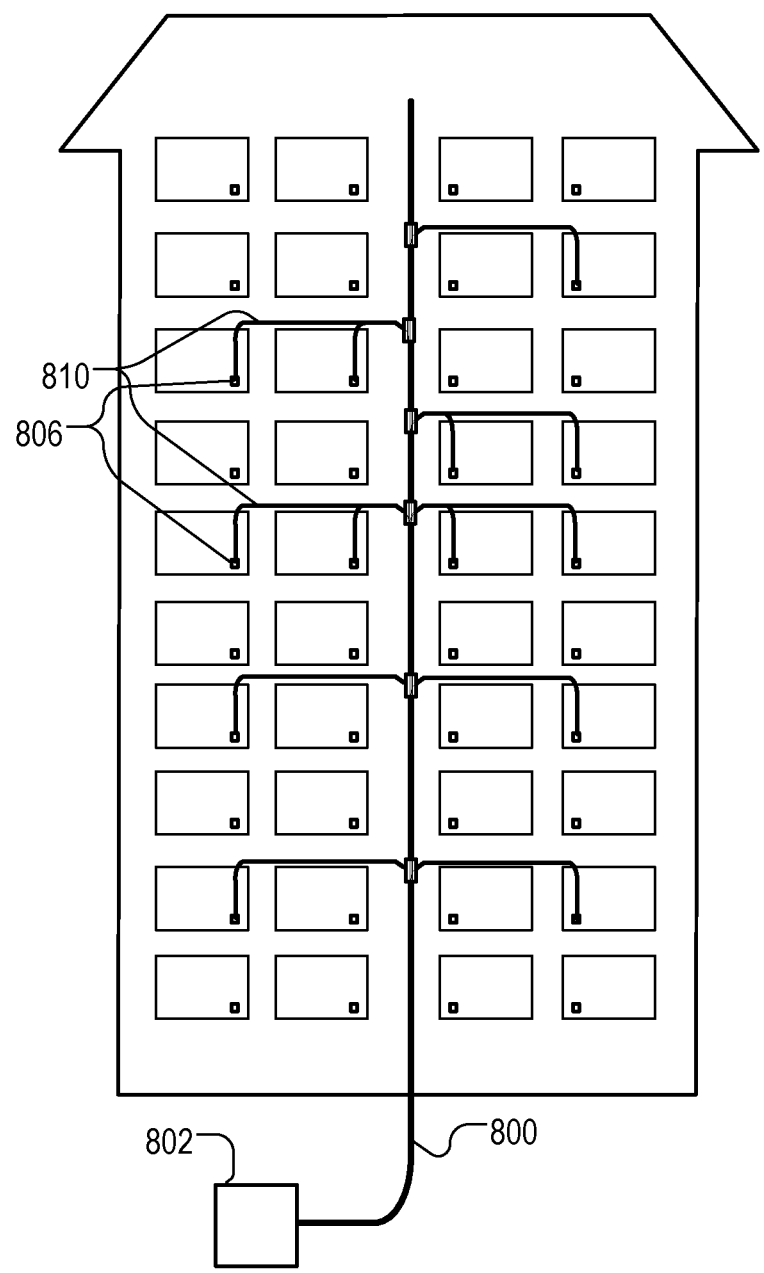
FIG. 10 illustrates application of a pullback cable as a riser cable in a multi-storey building.

FIG. 10 illustrates how pullback cables can be used also within premises, as well as externally. A particular application for pullback cables is in risers, multi-storey buildings. As illustrated, a modified pullback cable according to the present disclosure is used as a riser cable 800. Branching of individual fibre units is provided through micro-ducts 810 to connect premises access points 806 to the distribution point 802. The micro-ducts can be installed as and when needed, or they may be installed to every premises at the same time as the riser 800.

As mentioned above, the requirement of the lining of the extruded tube in the modified pullback cable according to the present disclosure is that it should not damage and/or adhere to the extruded sheath of individual fibre units, even through the process of extrusion of the extruded tube 504 around the bundle of pre-manufactured fibre units. Polypropylene, with or without additives, has been mentioned as a material suitable for this lining. As an alternative to polypropylene, at least a lining of the extruded polymer tube may comprise primarily nylon. Grade 11 or 12 nylon may be suitable, for example. Nylon has the benefit of hardness and low friction, but will typically be more expensive than polypropylene. Due to different thermal characteristics of nylon and polyethylene, extra care may be required to avoid delamination of the nylon lining from the polyethylene body of the extruded tube 504.

Figure 11:
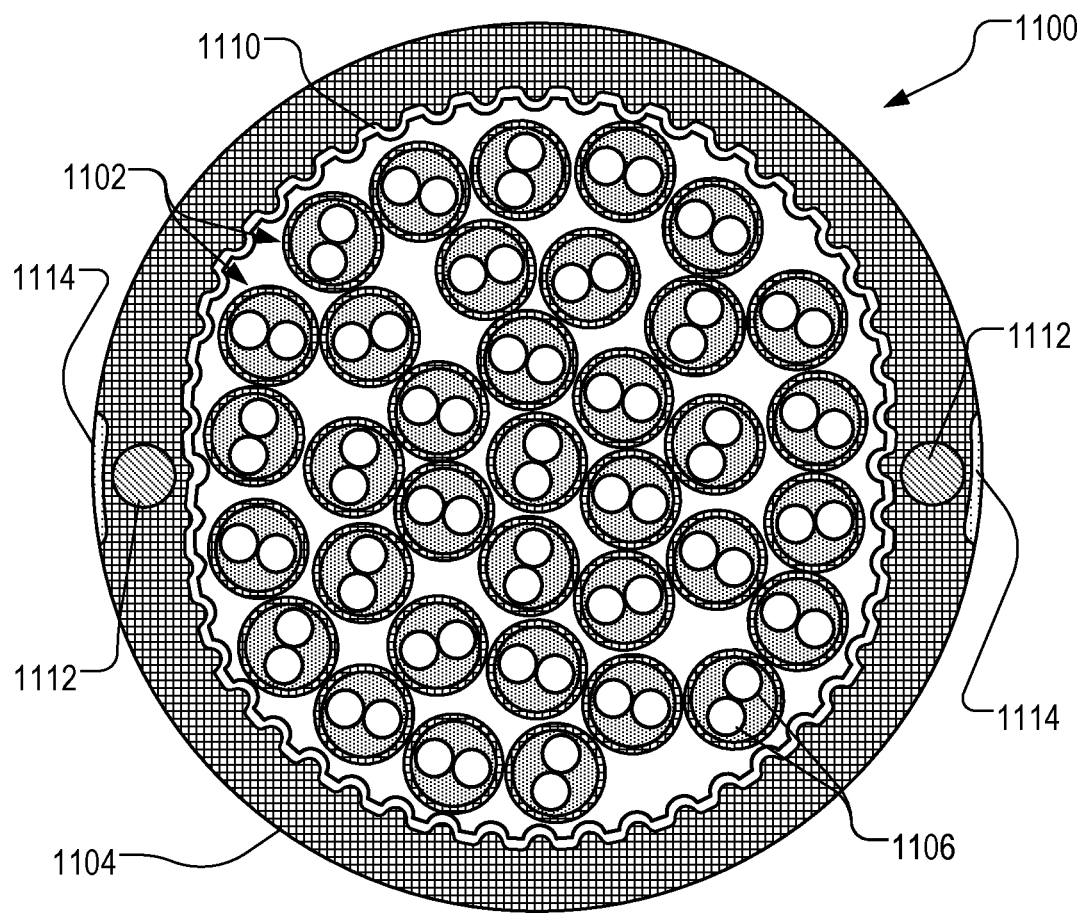
FIG. 11 is a cross-section of a modified pullback cable according to another embodiment of the invention.

FIG. 11 illustrates a cross-section of a modified pullback cable 1100 according to an embodiment of the present invention. The features of the pullback cable 1100 correspond with similarly-numbered features those of pullback cable 500 shown in FIG. 5(a), but the references used are preceded with 11 instead of 5. The cable 1100 thus comprises a plurality of fibre units 1102 extending in parallel with one another within an extruded polymer tube 1104. Each fibre unit 1102 includes a plurality of individual optical fibres 1106. As in the known pullback cable 500, the fibre units 1102 are free to slide relative to one another and relative to the tube 1104 such that a selected fibre unit 1102 can be accessed and re-directed by forming an opening in a wall of the tube 1104 and withdrawing a length of the selected fibre unit 1102 through the opening.

Other features and advantages of the pullback cable 1100 the same as described above for pullback cable 500. The same alternatives and modifications also apply. Only the differences from pullback cable 500 will now be described in a little detail.

The modified pullback cable 1100 differs from the pullback cable 500, illustrated in FIGS. 5(a) and 5(b) because the lining 1110 of the tube 1104 includes an internally ribbed or undulating profile. To manufacture such a tube 1104, the extrusion tooling used to form the tube may for example include a tip of profiled cross-section, such that the ribbed profile is applied directly to the lining 1110 and the body material which presses in behind it. The term "ribs" and "ribbed" as used herein are not intended to imply any particular shape or distribution. Any form of projection that can be imparted during extrusion to reduce the contact area can be employed.

The inclusion of this ribbed profile reduces a contact surface area between a fibre unit 1102 and the lining 1110 of the tube 1104, during manufacture and use. The reduced surface contact provides for easier retrieval/pullback of fibre units 1102 from the cable 1100. In particular, reduced contact surface area reduces the risk of these surfaces sticking together when the tube 1104 is extruded over multiple fibre units 1102. The design with the ribbed surface may therefore permit a large number of fibre units to be included within the same diameter of tube 1104, without manufacturing problems.

Figure 12:
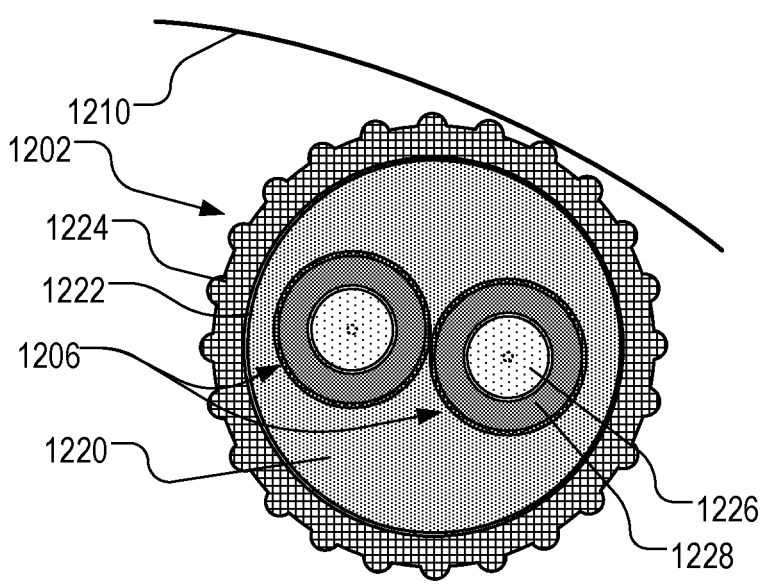
FIG. 12 is a schematic cross-section of a modified fibre unit usable for example in the pullback cable of FIG. 5 or FIG. 11.

FIG. 12 shows schematically the form of a modified fibre unit 1202. The features in FIG. 12 correspond with those in FIG. 5(b), but the references used are preceded with 12 instead of 5. The fibre unit 1202 has the features and advantages of fibre unit 502, and all of the alternatives and optional features described above apply here also. Only the differences will be described in detail.

Compared with the example 502, extruded polymer sheath 1224 in the fibre unit 1202 provides a ribbed or undulating profile. The ribbed or undulating profile reduces the contact surface area between a fibre unit 1202 and the lining 1210 of the tube. This is illustrated in FIG. 12, where it is evident that a single peak of one undulation is in touching contact with the lining 1210. Ribs may be formed for example by a suitably formed die in the extrusion of the sheath 1224 over the coated fibre bundle.

In designing and manufacturing a pullback cable, the ribbed fibre unit 1202 can be used in combination with a tube 504 having smooth-lining, or a tube 1104 having a ribbed lining. Similarly, the tube 1104 having the ribbed inner surface can be used in combination with a ribbed fibre unit 1202 or a fibre unit with a smooth or other-textured surface.

As mentioned in the introduction, the polymer of the extruded polymer sheath 524/1224 may include various additives, such as for friction reducing, colouring, UV protection, antistatic etc. The polymer may also include cross-linked material and/or fillers. These measures may be taken to improve dimensional stability over variations of time and/or temperature, resistance to chemical attack and the like. As is well-known thermoplastic materials may be crosslinked by adding crosslinking agents like silane or peroxide during the material mixing process or as an additive in the original materials. Crosslinking may also be obtained by subjecting the cable sheaths to radiation. The measures applied for cross-linking in embodiments of the invention may be the same as, or variants of those discussed in the prior patent applications US2003035635A1, EP0241330A2 and WO2019053146A1 mentioned in the introduction. Similar measures may be included in the polymer of the tube 504/1104, either in the lining 510/1110, or in the body material or in both.

Cross-linking, in particular, may provide additional dimensional stability under elevated temperatures experienced during extrusion of the tube 504/1104 over the bundle of fibre units 502/1102/1202. Such a measure, either alone or in combination with other measures such as the ribs shown in FIG. 11 and/or FIG. 12, may be effective to reduce the risk of sticking between the fibre units and the extruded tube during manufacture of the pullback cable 500/1100, as well as during installation and operation after manufacture.

According to some embodiments material of the extruded sheath 524/1224 comprises a mixture of cross-linkable polyethylene (PEX) and high-density polyethylene (HDPE) as the main components, together of course with any minor components such as colour master batch, antifriction agents and so on. For catalyst-based cross-linking, a proportion of catalyst master batch may also be provided, in accordance with manufacturers' recommendations.

In some embodiments, cross-linking is allowed to complete substantially, before the fibre units are bundled and covered by the tube 504/1104. Controlled conditions of time and/or environmental conditions such as elevated temperature and/or humidity can be applied, to accelerate the curing. Curing may be performed in accordance with manufacturers' recommendations, while avoiding any conditions that would damage or impair the mechanical or optical performance of the fibre unit.

Depending on the proportion of cross-linkable polymer against other components in the sheath material, cross-linking when be completed may result in a gel content anywhere from 15% to 80%, when determined according to ISO 10147:2011. The examples described in WO2019053146A1, the degree of cross-linking may be in the range of from 15% to 80%, for instance from 20% to 70%. In some embodiments, including those made with a blend of PEX and HDPE, the degree of cross-linking may be in the range of from 30 to 60%, such as from 30% to 50%. The said degree of cross-linking may be defined at time prior to manufacturing the pull-back cable 500/1100. Alternatively, the degree of cross-linking may be defined as measured at a time after manufacture. In that case, the degree of cross-linking may have increased slightly to its final value, even if it was substantially complete at the time of manufacture. "Substantially complete" in this regard may mean a degree of cross-linking greater than half the final value, such that properties of the sheath are influenced by the cross-linking at the time of extrusion of the tube 504/1104.

The density of the sheath material will depend on the materials blended into it, as well on processing conditions. The density of the sheath material may be greater than 935, optionally greater than 940 kg/m. The density of a sheath material based on HDPE may be for example in the range 940-950 kg/m, while a material based on a PEX blended with, say 30% or more HDPE may be in the range 935-950 kg/m.

Any of the example sheath materials specifically disclosed in WO2019053146A1 may be applied as sheath material in the examples above.

According to other embodiments, cross-linking may optionally be applied the body of the extruded tube 504/1104, and optionally in the lining.

While specific embodiments of the present invention have been described above, it will be appreciated that departures from the described embodiments may still fall within the scope of the present invention, defined by the appended claims and their equivalents.

The invention claimed is:

1. A fibre optic cable comprising a plurality of retractable fibre units extending in parallel with one another within a polymer tube, the fibre units being free to slide relative to one another and to the polymer tube such that a selected fibre unit can be accessed and re-directed by forming an opening in a wall of the polymer tube and withdrawing a length of the selected fibre unit through the opening, wherein each of said fibre units comprises two or more optical fibres embedded in a solid resin material to form a coated fibre bundle and a polymer sheath covering the coated fibre bundle, wherein the polymer sheath of each said fibre unit comprises primarily polyethylene (PE) polymer, wherein a lining of the polymer tube of the fibre optic cable is formed by polymer other than polyethylene, and wherein the polymer tube of the fibre optic cable comprises a co-extrusion of said lining within a main tubular body of a different polymer to the lining.

2. The fibre optic cable as claimed in claim 1 wherein said lining of the polymer tube comprises primarily polypropylene (PP).

3. The fibre optic cable as claimed in claim 1 wherein said lining of the polymer tube comprises primarily nylon.

4. The fibre optic cable as claimed in claim 1, wherein the polymer sheath of each said fibre unit comprises a mixture of PE polymer and one or more additives including a friction reducing material.

5. The fibre optic cable as claimed in claim 1 wherein the material of said polymer sheath has a density of at least 935 kg/m$^3$.

6. The fibre optic cable as claimed in claim 1 wherein said PE polymer is at least partially cross-linked, a degree of cross-linking determined according to ISO 10147:2011 being in the range from 15% to 80%.

7. The fibre optic cable as claimed in claim 1 wherein an inner surface of the polymer tube of the fibre optic cable has been formed with projections effective to reduce an area of contact between material of the tube and the fiber units.

8. The fibre optic cable as claimed in claim 1 wherein said polymer tube is extruded with one or more strength members integrated in a main wall of the tube during extrusion.

9. The fibre optic cable as claimed in claim 1 wherein, when said fibre optic cable is laid out in a generally straight route, a length of 100 m of a selected fibre unit can be withdrawn through an opening in the polymer tube at a speed greater than 1.4 m/s, without a pulling force exceeding the weight of a mass W, defined as the mass per kilometre length of the selected fibre unit.

10. The fibre optic cable as claimed in claim 1 wherein, when said fibre optic cable is laid out in a generally straight route, a length of 100 m of a selected fibre unit can reliably be withdrawn through an opening in the polymer tube at a speed of 1.4 m/s, without a pulling force exceeding 5 N multiplied by the number of optical fibres in the selected fibre unit.

11. The fibre optic cable as claimed in claim 1 wherein, when said fibre optic cable is laid out in a generally straight route, a length of 200 m of a selected fibre unit can be withdrawn through an opening in the polymer tube at a speed of 1.4 m/s, without a pulling force exceeding 5 N multiplied by the number of optical fibres in the selected fibre unit.

12. A method of manufacturing a fibre optic cable comprising a plurality of fibre units extending in parallel with one another within a polymer tube, the method comprising:
    (a) receiving said plurality of fibre units, each fibre unit having been manufactured previously and comprising two or more optical fibres embedded in a solid resin material to form a coated fibre bundle and a polymer sheath covering the coated fibre bundle, the polymer sheath comprising primarily polyethylene (PE) polymer;
    (b) feeding said plurality of fibre units together as a bundle through a central opening in an extrusion die, while extruding said polymer tube through said die around the bundle, a lining of the polymer tube being formed by polymer other than polyethylene, the polymer tube of the fibre optic cable being formed by co-extrusion of said lining within a main tubular body of a different polymer to the lining;
    (c) drawing said polymer tube and bundle through the extrusion die while controlling process parameters to draw and cool the polymer tube to have finished interior and exterior dimensions such that the fibre units remain loose within the polymer tube,
    thereby producing said fibre optic cable such that a selected fibre unit can be accessed and re-directed by forming an opening in a wall of the polymer tube and withdrawing a length of the selected fibre unit through the opening.

13. The method as claimed in claim 12 wherein said lining of the polymer tube comprises primarily polypropylene.

14. The method as claimed in claim 12 wherein said lining of the polymer tube comprises primarily nylon.

15. The method as claimed in claim 12 wherein the polymer sheath of each said fibre unit comprises a mixture of PE polymer and one or more additives including a friction reducing material.

16. The method as claimed in claim 12 wherein the material of said polymer sheath has a density of at least 935 kg/m$^3$.

17. The method as claimed in claim 12 wherein said PE polymer is at least partially cross-linked, a degree of cross-linking determined according to ISO 10147:2011 prior to step (b) being in the range from 15% to 80%.

18. The method as claimed in claim 12 wherein an inner surface of the polymer tube of the fibre optic cable is formed with projections effective to reduce an area of contact between material of the tube and the fiber units.

19. The method as claimed in claim 12 wherein the solid resin material has a tensile modulus greater than 100 MPa.

20. The method as claimed in claim 12 wherein said main tubular body is of polyethylene.

21. The method as claimed in claim 12 wherein said main tubular body is extruded of medium density polyethylene (MDPE).

22. The method as claimed in claim 12 wherein in step (b) said polymer tube is extruded with one or more strength members integrated in the main tubular body.

23. A method of providing fibre optic connections from a distribution point to a plurality of customer access points, the method comprising:
    (a) installing an optical fibre cable as claimed in claim 1 extending from the distribution point and past the plurality of customer access points;
    (b) for a customer access point, providing an opening in the tube wall of the fibre optic cable at a location convenient for the customer access point and withdrawing a length of a selected fibre unit through the opening;
    (c) providing a branching duct from the vicinity of said opening to said customer access point;
    (d) installing the withdrawn length of the selected fibre unit through the branching duct from the opening to the access point; and
    (e) repeating steps (b) to (d) for successive customer access points, selecting a different fibre unit each time and forming a new opening or re-using an existing opening at a convenient location.

24. The method as claimed in claim 23 wherein for at least one selected fibre unit the length of fibre unit withdrawn through the opening exceeds 100 m.

25. The method as claimed in claim 23 wherein for at least one selected fibre unit the length of fibre unit installed through the branching duct exceeds 100 m.

26. The method as claimed in claim 23 wherein for at least one customer access point in step (d) the selected fibre unit is installed through the branching duct by pushing.

27. The method as claimed in claim 23 wherein for at least one customer access point in step (d) the selected fibre unit is installed through the branching duct by blowing.

* * * * *